(12) United States Patent
Uchida et al.

(10) Patent No.: US 7,468,822 B2
(45) Date of Patent: Dec. 23, 2008

(54) HOLOGRAPHIC RECORDING MEDIUM

(75) Inventors: Akiyoshi Uchida, Kawasaki (JP); Toshikazu Kanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 373 days.

(21) Appl. No.: 11/342,438

(22) Filed: Jan. 30, 2006

(65) Prior Publication Data
US 2007/0076563 A1 Apr. 5, 2007

(30) Foreign Application Priority Data
Oct. 3, 2005 (JP) ............................. 2005-290341

(51) Int. Cl.
*G03H 1/02* (2006.01)
(52) U.S. Cl. .................. 359/3; 359/6; 369/44.11
(58) Field of Classification Search ............ 359/6
See application file for complete search history.

(56) References Cited

U.S. PATENT DOCUMENTS

2004/0027668 A1* 2/2004 Ayres et al. ............... 359/566

2007/0195664 A1* 8/2007 Kadowaki et al. ......... 369/44.37

FOREIGN PATENT DOCUMENTS

JP 2001-031395 2/2001

* cited by examiner

*Primary Examiner*—Fayez G Assaf
(74) *Attorney, Agent, or Firm*—Greer, Burns & Crain, Ltd.

(57) ABSTRACT

This invention is a holographic recording medium including a track in which position information to specify a recording position and a reproducing position of page data is formed. The position information of the track is formed of position detection patterns. The position detection patterns each including a first detection mark row including center pits arranged at predetermined intervals; and a second detection mark row including side marks arranged at the same intervals as the intervals of the center pits, the side marks having lengths substantially corresponding to integral multiples of the intervals of the center pits. The second detection mark row is arranged adjacent to the first detection mark row such that both ends of the side marks are arranged so as to correspond to the center pits in a track width direction, and page data is recorded and reproduced on the basis of positions of the center pits or positions of the ends of the side marks.

5 Claims, 21 Drawing Sheets

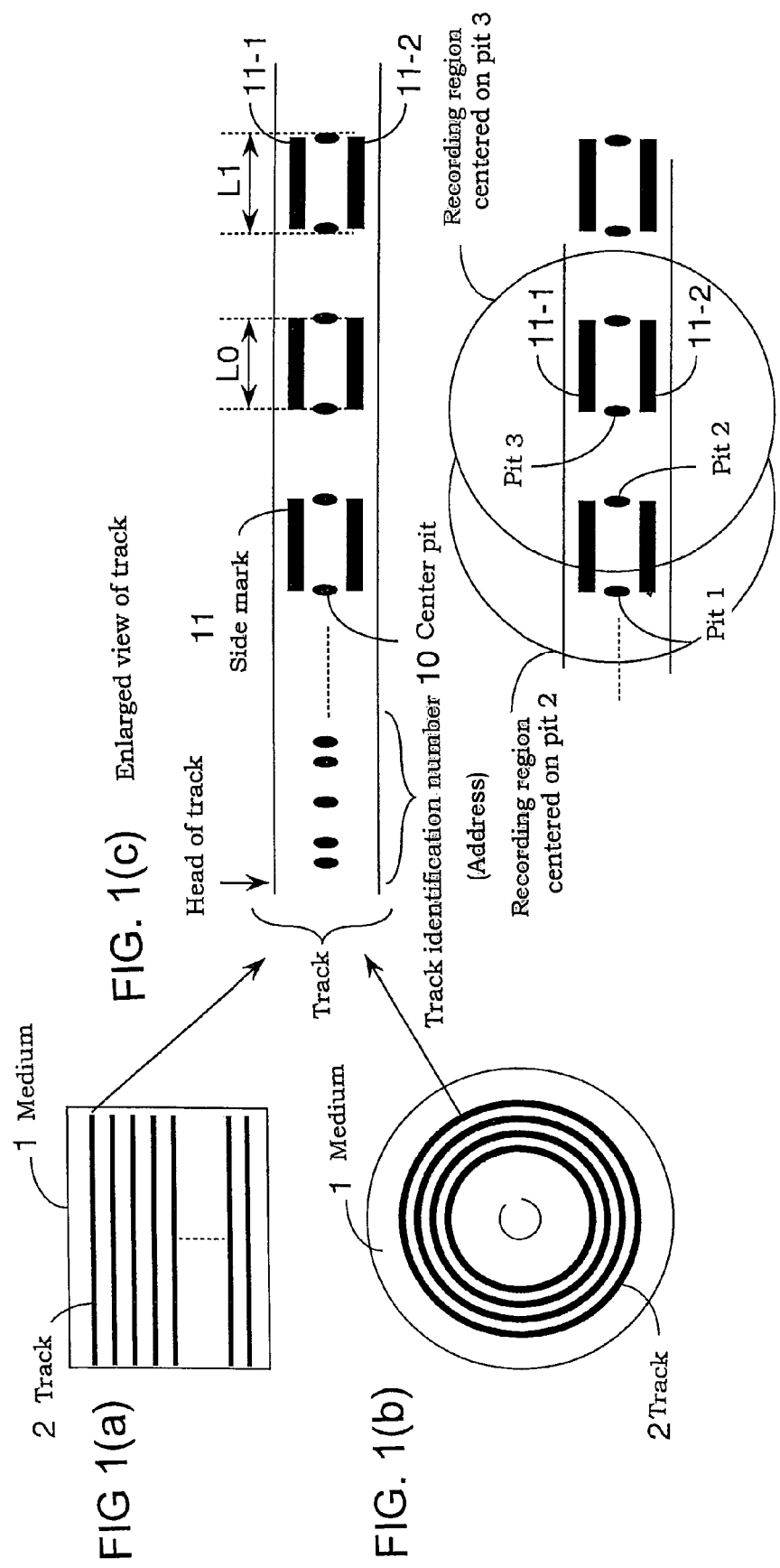

Both-side side mark

Single-side side mark

No center pit

TES slit is used as side mark

FIG. 4
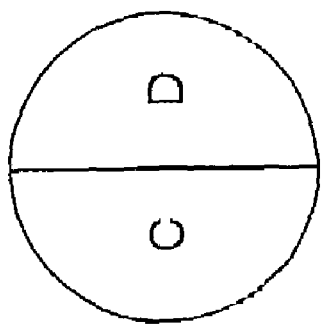
Detection surface of beam detector PD2 of center beam B2
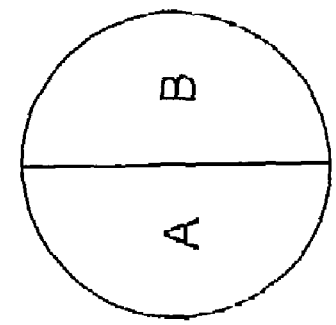
Detection surface of beam detectors PD1 and PD3 of side beams B1 and B3

FIG. 5 (a)

Normal case (defect 20 does not exist)

| Position of beam spot | P1 | P2 | P3 | P4 |
|---|---|---|---|---|
| Differential signal S1 (A-B) of beam detector PD2 | 1 | 1 | 0 | 1 |
| Differential signal S5 (C-D) of beam detectors PD1 and PD3 (detection position signal S0) | 1 | -1 | 0 | 1 |

FIG. 5(b)

Abnormal case (defect 20 exists)

| Position of beam spot | P1 | P2 | P3 | P4 |
|---|---|---|---|---|
| Differential signal S1 (A-B) of beam detector PD2 | 1 | 1 | 1 | 1 |
| Differential signal S5 (C-D) of beam detectors PD1 and PD3 (detection position signal S0) | 1 | -1 | 0 | 1 |

Detection of defective position

Normal position detection

Detection error of position marker P3 in abnormal position detection

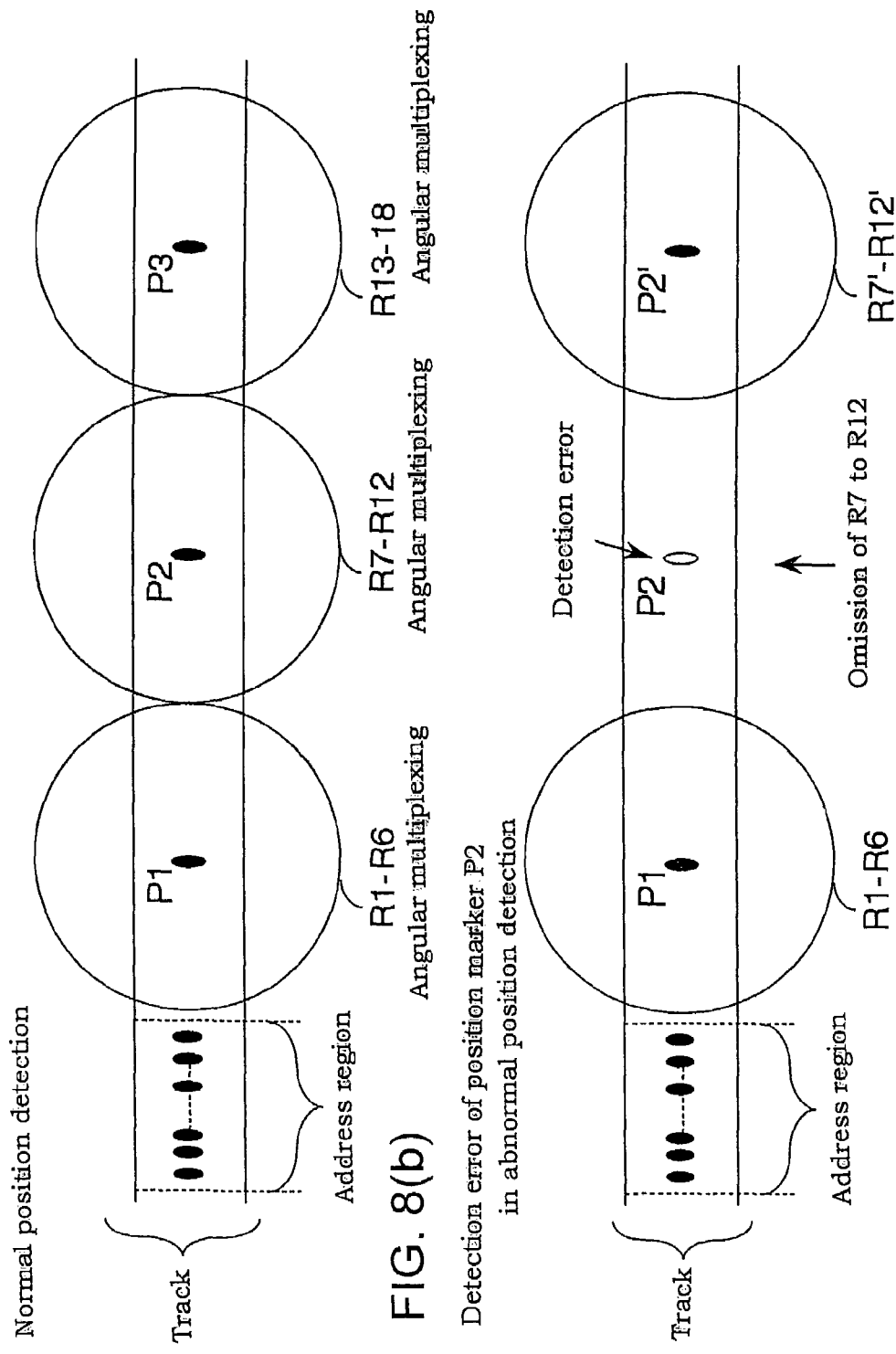

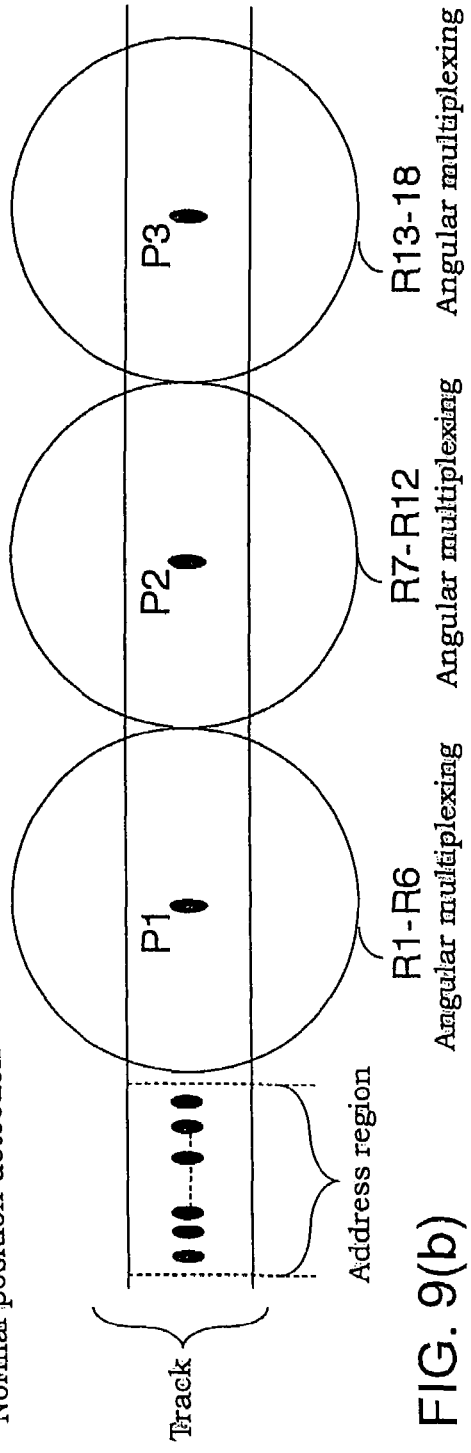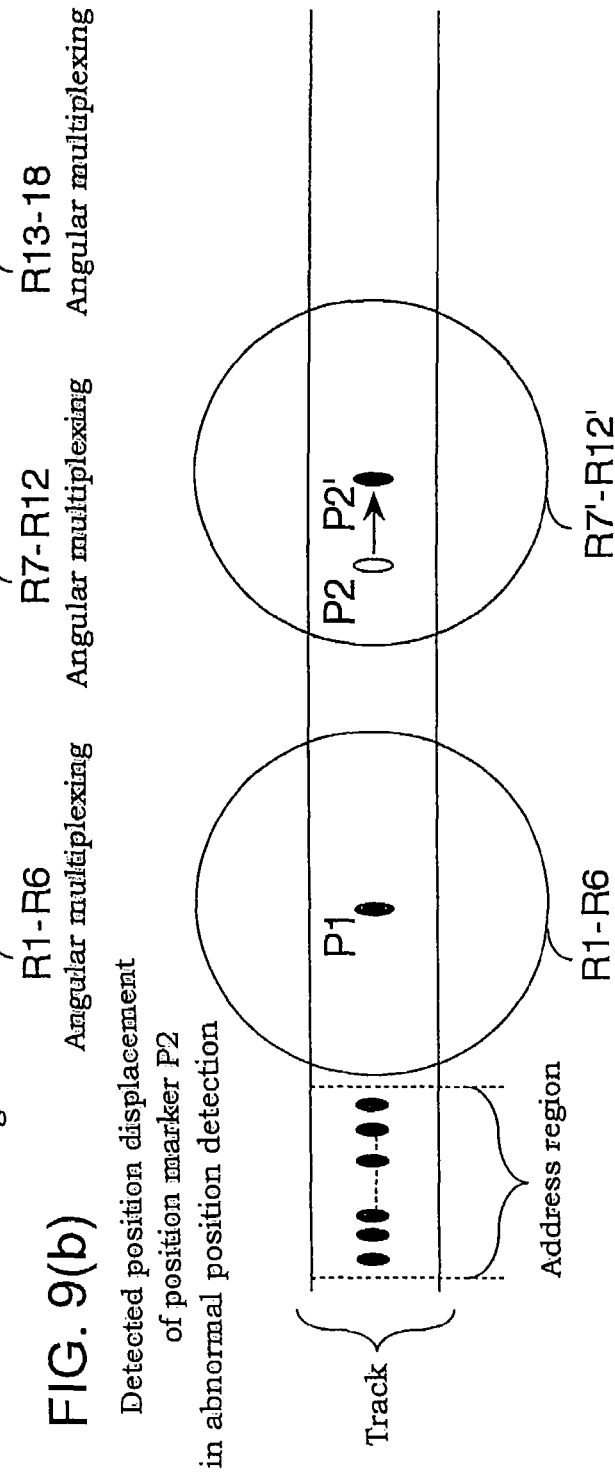
FIG. 9(a) Normal position detection
FIG. 9(b) Detected position displacement of position marker P2 in abnormal position detection

FIG. 12(a)

Normal case (detection error does not exist)

| Position of beam spot | P11 | P12 | P13 | P14 |
|---|---|---|---|---|
| Differential signal S1 (A-B) of beam detector PD2 | 1 | 1 | 1 | 1 |
| Differential signal S5 (C-D) of beam detectors PD1 and PD3 (position-detection signal S0) | 1 | -1 | 1 | -1 |

FIG. 12(b)

Abnormal case (center pit in position P12 is imperfect and detection error exists)

| Position of beam spot | P11 | P12 | P13 | P14 |
|---|---|---|---|---|
| Differential signal S1 (A-B) of beam detector PD2 | 1 | 0 | 1 | 1 |
| Differential signal S5 (C-D) of beam detectors PD1 and PD3 (position-detection signal S0) | 1 | -1 | 1 | -1 |
| Position detection signal S0 | 1 | 0 | 1 | -1 |

Detection of center pit position

FIG. 13(a)

Normal case (detection error does not exist)

| Position of beam spot | P11 | P12 | P13 | P14 |
|---|---|---|---|---|
| Differential signal S1 (A-B) of beam detector PD2 | 1 | 1 | 1 | 1 |
| Differential signal S5 (C-D) of beam detector PD1 | 1 | 0 | 0 | -1 |
| Differential signal S6 (E-F) of beam detector PD3 | 1 | -1 | 1 | -1 |

FIG. 13(b)

Abnormal case (center pits in positions P12 and P13 are imperfect and detection error exists)

| Position of beam spot | P11 | P12 | P13 | P14 |
|---|---|---|---|---|
| Differential signal S1 (A-B) of beam detector PD2 | 1 | 0 | 0 | 1 |
| Differential signal S5 (C-D) of beam detector PD1 | 1 | 0 | 0 | -1 |
| Differential signal S6 (E-F) of beam detector PD3 | 1 | -1 | 1 | -1 |

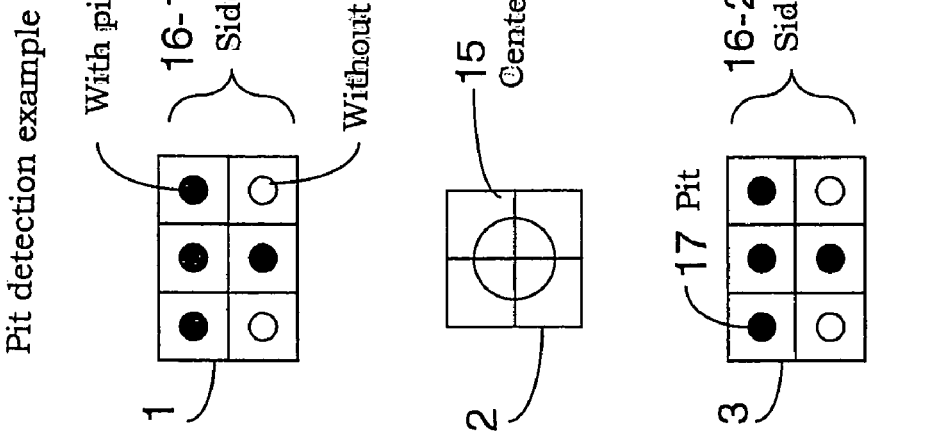
FIG. 18(a) Configuration of detection surface
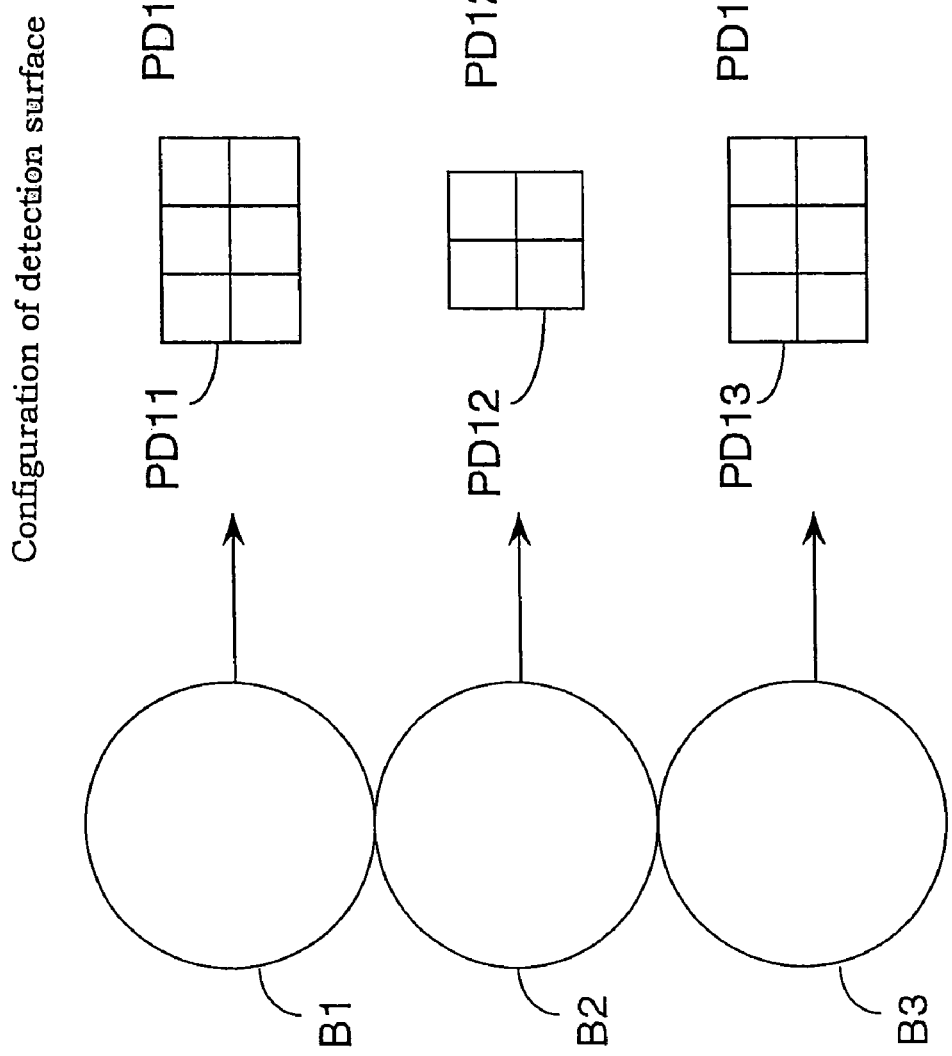
FIG. 18(b) Pit detection example

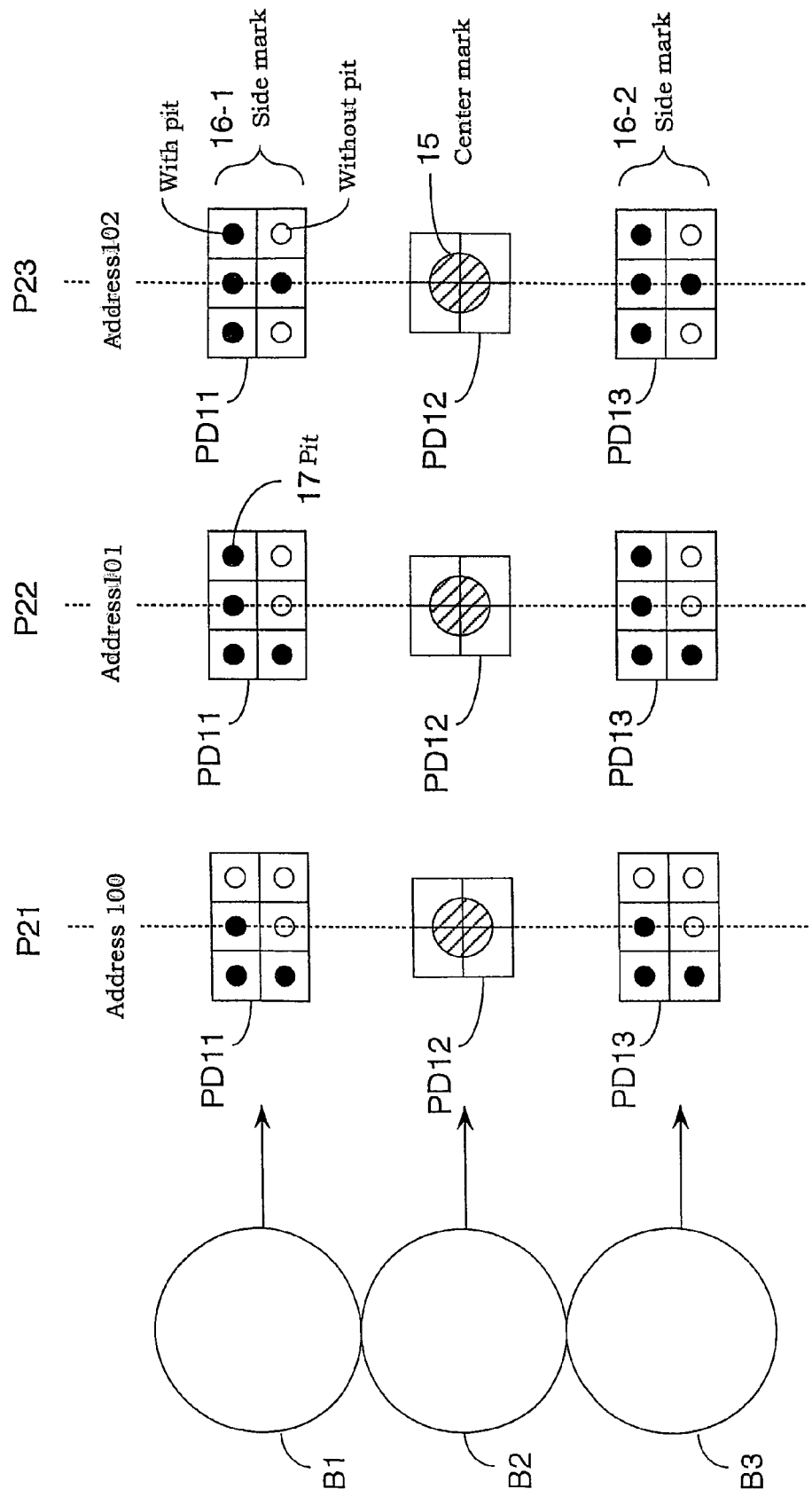

HOLOGRAPHIC RECORDING MEDIUM

CROSS-REFERENCE TO RELATED APPLICATIONS

This application is related to Japanese application No. 2005-290341 filed on Oct. 3, 2005, whose priority is claimed under 35 USC § 119, the disclosure of which is incorporated by reference in its entirety.

BACKGROUND OF THE INVENTION

1. Field of the Invention

The present invention relates to a holographic recording medium and more particularly, to a medium in which holographic recording/reproducing can be performed after a recording position or a reproducing position is detected in the medium.

2. Description of the Related Art

According to a conventional magneto-optical recording medium (such as MO), while address information previously recorded on the medium is detected, a seek operation is performed in which an optical component and the like is moved by a distance corresponding to a difference between a detected present address and a target address in which recording (or reproducing) is to be performed, and after the present address coincides with the target address, information is recorded/reproduced.

FIG. 21 is a schematic explanatory view showing a recording region of the conventional magneto-optical recording medium.

Referring to FIG. 21, an address region and a data region are alternately arranged on one track and, for example, just after a certain address region, a data region corresponding to that address region is arranged.

In addition, in one address region, a row of pits is formed to specify an address specific to the address region.

The row of pits is formed in the address region shown in FIG. 21 and a target address is searched by reading the pit row and data is recorded in the data region corresponding to the target address.

If the recording is performed before the target address and the present address coincide with each other, existing data could be destroyed or data which is different from the target data is read out due to a defect of reproduction. As a result, normal recording/reproducing cannot be performed. Thus, it is very important to confirm that the present address and the target address coincide with each other. Such confirmation of the address coincidence is also important in a holographic recording medium in which two-dimensional page data is multiplex-recorded.

Japanese Unexamined Patent Publication No. 2005-31395 proposes an address information adding method in which address information is arranged together with data in a two-dimensional information page to facilitate an addressing operation, and a position error between the address information and holographic data can be detected. Here, there is described a holographic recording medium in which a position of an address information region is differentiated every page, and an address is detected by a sum of detected light amounts, and after the multiplex-recorded two-dimensional page information is reproduced, position displacement can be detected.

However, according to the holographic recording, since plural pieces of information (two-dimensional page data) are multiplex-recorded in the same physical region, its recording density is considerably high as compared with the conventional magneto-optical medium (such as MO). Therefore, if an address is allocated to one recording unit like the conventional MO, since a ratio occupied by recording region to be used for recording the address information is increased, it is actually difficult to allocate the address like the conventional MO.

Thus, according to the conventional holographic recording, it is difficult to confirm that the target address coincides with the present address every recording unit before the data is recorded or reproduced like an address detection process of the conventional MO.

In addition, according to Japanese Unexamined Patent Publication No. 2005-31395, the position displacement of the recording or reproducing position can be detected after the two-dimensional page information containing the address information is reproduced. However, since the recording capacity of the page information which is one unit for the recording/reproducing is very large such as hundreds of megabytes, it takes a lot of time to reproduce the page information itself.

That is, since it is found that the address information is different from the target address after the page data containing the address information is reproduced, which takes a lot of time, a waste time is consumed for the reproducing, so that it takes a lot of time to perform the reproducing process substantially.

In addition, according to the holographic recording in which it takes time to reproducing the data, it is desirable that the address information to be reproduced is detected and then it can be detected that the address information is displaced before the reproducing process of the two-dimensional page data in order to improve time efficiency in reproducing the page data.

SUMMARY OF THE INVENTION

The present invention provides a holographic recording medium which includes a track in which position information to specify a recording position and a reproducing position of page data is formed, the position information of the track being formed of position detection patterns, the position detection patterns each including a first detection mark row including center pits arranged at predetermined intervals; and a second detection mark row including side marks arranged at the same intervals as the intervals of the center pits, the side marks having lengths substantially corresponding to integral multiples of the intervals of the center pits, wherein the second detection mark row is arranged adjacent to the first detection mark row such that both ends of the side marks are arranged so as to correspond to the center pits in a track width direction, and page data is recorded and reproduced on the basis of positions of the center pits or positions of the ends of the side marks. Thus, it is possible to improve a detection precision of a recording and reproducing position.

BRIEF DESCRIPTION OF THE DRAWINGS

FIG. 1 is an explanatory diagram showing position detection patterns according to a first embodiment of the present invention;

FIG. 4 is an explanatory diagram showing a light detection surface of a beam detector for detecting a position according to the present invention;

FIG. 5 is an explanatory diagram showing variations of a differential signal and a position detection signal according to one embodiment of the present invention;

FIG. 8 is an explanatory diagram showing shifted position detection which becomes a problem in a general angular multiplexing and shifted recording method;

FIG. 9 is an explanatory diagram showing shifted position detection which becomes a problem in a general angular multiplexing and shifted recording method;

FIG. 12 is an explanatory diagram showing variations of a differential signal and a position detection signal according to one embodiment of the present invention;

FIG. 13 is an explanatory diagram showing a variation of a differential signal when two position detection errors sequentially occur according to the present invention;

FIG. 18 is an explanatory diagram showing a light detection surface of a beam detector for detecting a position according to the third embodiment of the present invention;

FIG. 19 is an explanatory diagram showing a position detection process in a normal case according to the third embodiment of the present invention;

DESCRIPTION OF THE PREFERRED EMBODIMENTS

Figure 2A:
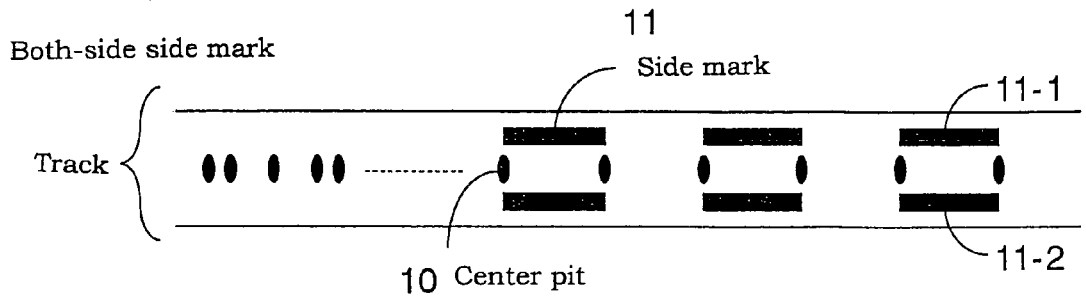
FIG. 2 is an explanatory diagram showing position detection patterns of a holographic recording medium according to another embodiment of the present invention.
Figure 2B:
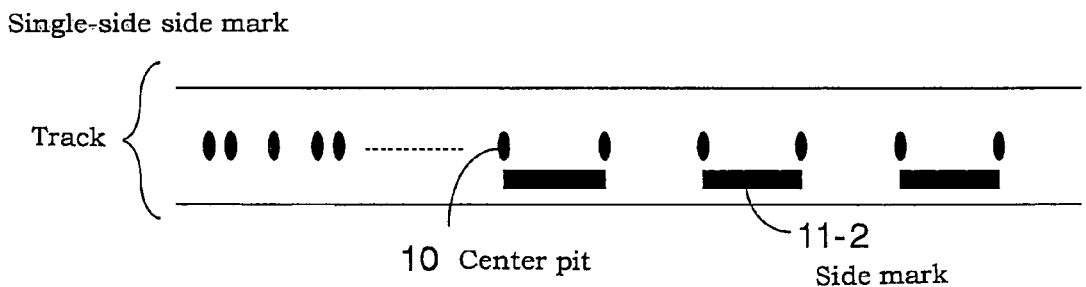
Figure 2C:
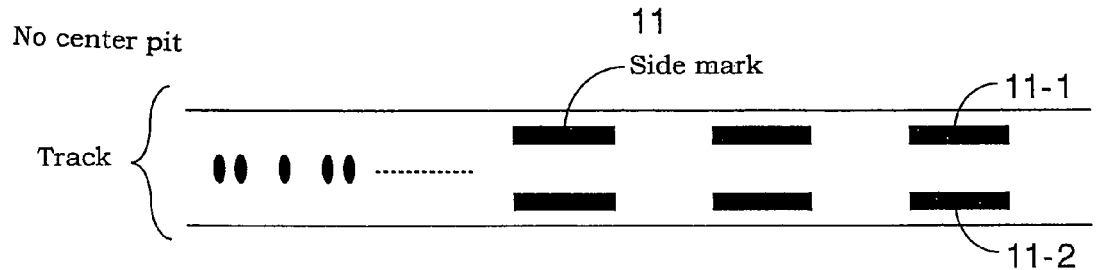
Figure 2D:
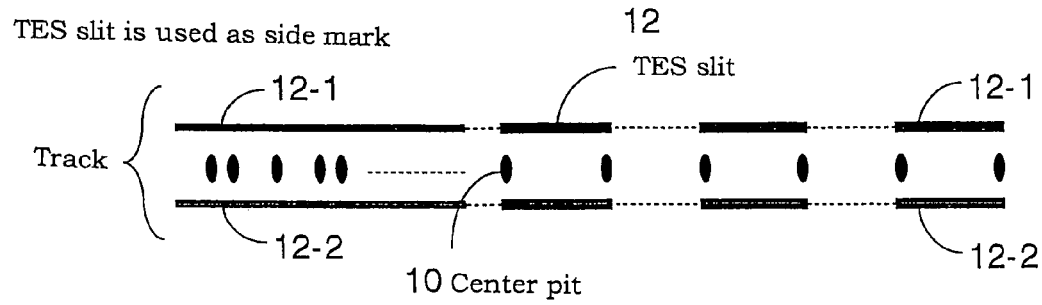

The present invention provides a holographic recording medium capable of confirming with high precision whether a present position is displaced from a target position before two-dimensional page data is recorded and reproduced or while it is being recorded and reproduced.

The present invention provides a holographic recording medium which includes a track in which position information to specify a recording position and a reproducing position of page data is formed, the position information of the track being formed of position detection patterns, the position detection patterns each including a first detection mark row including center pits arranged at predetermined intervals; and a second detection mark row including side marks arranged at the same intervals as the intervals of the center pits, the side marks having lengths substantially corresponding to integral multiples of the intervals of the center pits, wherein the second detection mark row is arranged adjacent to the first detection mark row such that both ends of the side marks are arranged so as to correspond to the center pits in a track width direction, and page data is recorded and reproduced on the basis of positions of the center pits or positions of the ends of the side marks. Thus, it is possible to improve a detection precision of a recording and reproducing position.

In the present invention, each end of the side marks of the second detection mark row coincides with the center of each center pit in the track width direction.

Further, the position detection patterns include one first detection mark row and two second mark rows arranged at both sides of the first detection mark row, a side mark A of one second detection mark row has a length corresponding to almost three times as long as the interval of the center pits, and each end of the side mark A is arranged so as to correspond to the center of the center pits in the track width direction, and a side mark B of the other second detection mark row has almost the same length as the interval of the center pits, and each end of the center pit B coincides with the center of each center pit in the track width direction.

In addition, the position detection patterns include one first detection mark row, the second detection mark row include two side marks A and B arranged on both sides of the first detection mark row, each of the side marks A and B of the second detection mark row has a length corresponding to almost three times as long as the interval of the center pits, and the side marks A and B of the second detection mark row are arranged such that each end corresponds to a position of the center pit of the first detection mark row in the track width direction, a left end of the side mark A does not coincide with a left end of the side mark B and a right end of the side mark A does not coincide with a right end of the side mark B.

The present invention also provides a holographic recording medium which includes a track in which position information to specify a recording position and a reproducing position of page data is formed, wherein position detection patterns which constitute the position information of the track include a detection mark row including side marks arranged at regular intervals, and page data is recorded and reproduced on the basis of an end position of the side marks.

The present invention also provides a holographic recording medium which includes a track in which position information to specify a recording position and a reproducing position of page data is formed, wherein the position information of one track includes a plurality of rows of position detection patterns, the plurality of rows of position detection patterns include a first detection mark row including center marks arranged at predetermined intervals, and a second detection mark row in which side marks each including a plurality of pits are arranged at predetermined intervals, the side mark is arranged in the vicinity of the first detection mark in a track width direction, and arrangement of the pits which constitute the side mark is different in each side mark and corresponds to a specific physical address, and page data is recorded and reproduced on the basis of positions of the center marks.

The present invention also provides a holographic recording medium which includes a track in which position information to specify a recording position and a reproducing position of page data is formed, wherein position detection patterns which constitute the position information of the track include a plurality of guide pitches arranged at regular intervals and a computer-generated hologram pattern formed between the guide pitches every predetermined number of guide pitches, the computer-generated hologram pattern is an indented pattern in which information to specify a physical address of its position is previously recorded, and page data is recorded and reproduced on the basis of the position of each of the guide pitches.

Embodiments of the present invention will be described with reference to the drawings hereinafter. In addition, the present invention is not limited to the following description of the embodiments.

(Constitution of Holographic Recording Medium According to First Embodiment of the Present Invention)

FIG. 1 shows a constitution of a holographic recording medium according to one embodiment of the present invention.

In FIG. 1, (a) is a plan view showing a rectangular card-shaped medium 1, and (b) is a plan view showing a disk-shaped medium 1.

Each medium has a track 2 in which position information for finding a recording position or a reproducing position has been previously formed on a medium surface. The position information contains track identification numbers and position detection patterns. The track identification number and the position detection pattern are formed at the time of manufacturing as fixed information which cannot changed before shipping.

A plurality of linear tracks 2 are formed in parallel in (a) of FIG. 1.

A plurality of tracks 2 are concentrically formed in (b) of FIG. 1.

For example, when a recording request of data into a certain logical address is provided, a physical address corresponding to the logical address is found and a position corresponding to the physical address is found while position detection patterns formed in the track 2 are checked. When the position is found, page data is holographically recorded into the position.

A shifted multiplex recording-type holographic recording medium in which plural pieces of page data are multiplex-recorded while they are slightly shifted will be described in the following embodiment.

In FIG. 1, (c) is an enlarged view showing an inside of one track of the medium according to the present invention. The left side is a head of the track in (c) of FIG. 1. In the track 2, a pit row (indented pattern) to specify an identification number of the track is formed in a predetermined region starting from the head of the track and then position detection patterns to specify a recording position and a reproducing position is formed.

The lateral direction of the track in (c) of FIG. 1 is a direction to shift a position to be irradiated with light and the light is shifted from the left to the right of the track at the time of recording and reproducing to detect the position detection pattern, so that a target recording/reproducing position is found.

The position detection patterns according to the present invention include a plurality of rows of patterns. For example, the position detection patterns include three rows of patterns in (c) of FIG. 1. The three rows are arranged in a track width direction. In addition, pits or marks which constitute one row of patterns are arranged in a direction perpendicular to the track width, that is, in the same direction as the light shifted direction.

As shown in (c) of FIG. 1, center pits 10 are arranged in the center of the track and rows of side marks 11-1 and 11-2 are provided on both sides of the row of the center pits 10. The row of the center pits 10 corresponds to a first detection mark row and the row of the side marks 11 corresponds to a second detection mark row.

The center pit 10 is a fine circular recess or a fine circular projection. In addition, the center pits 10 are arranged at regular intervals in the light shifted direction. The interval of the center pits 10 corresponds to a length (pitch) of a shifted amount of the light and may be about 10 μm, for example, and the position of the center pit 10 becomes a criterion of a region in which page data is recorded and reproduced.

Each end of the side mark 11 is arranged at a position corresponding to the center pit 10 in the track width direction and formed at a position apart from the center pit at a small distance (about 10 μm, for example) in the track width direction in the vicinity of the center pit 10.

In addition, the side mark 11 has a length corresponding to almost an integral multiple of the interval of the center pit 10 and arranged at the same interval as that of the center pit 10. The side mark 11 is illustrated as a linear mark having a length of an interval LO of the two adjacent center pits 10 in (c) of FIG. .1.

Each end of the side mark 11 coincides with the center of the center pit 10 in the track width direction in (c ) of FIG. 1. Although the length of the side mark 11 is equal to the distance L0 between the centers of the two center pits 10 in (c) of FIG. 1, it may be equal to a distance L1 (L1>L0) from a left end of the left center pit 10 to a right end of the right center pit 10.

In addition, the side marks 11 are arranged at regular intervals in the light shifted direction similar to the center pits 10. As shown in (c) of FIG. 1, when the side mark 11 is provided between the first and second center pits 10, the side mark is not provided between the second and third center pits 10 but the side mark 11 is provided between the third and fourth center pits 10.

In (c) of FIG. 1, address information is not contained in the center pit 10 nor the side marks 11-1 and 11-2 and each of them is simply a convex pattern or a concavo pattern.

Therefore, it is determined what number shifted position is at present by counting the number of the center pits 10 from the left of the track. For example, when the page data is to be recorded in the third shifted position (pit 3), the third center pit 10 from the left is detected and a recording region centered on the third center pit 10 is irradiated with lights (information light and reference light) to record the page data. In (c) of FIG. 1, a recording region centered on the second center pit 2 and a recording region centered on the third center pit 3 are illustrated.

According to the holographic recording, since the multiplex recording can be implemented, a region irradiated with light at the time of recording can be larger than the track width and also larger than the center pit interval L0. That is, according to the shifted multiplex recording, the adjacent recording regions may be partially overlapped with each other.

When the recorded page data is reproduced, similar to the recording process, a center pit of a position to be reproduced is found and the reference light is applied to the position centered on the center pit to reproduce page data. The region irradiated with the light at the time of reproducing has the same size as that at the time of recording.

The present invention is characterized in that a recording position or a reproducing position is confirmed before the recording process or the reproducing process, and the center pit 10 and the side mark 11 are used in confirming the position.

Figure 3:
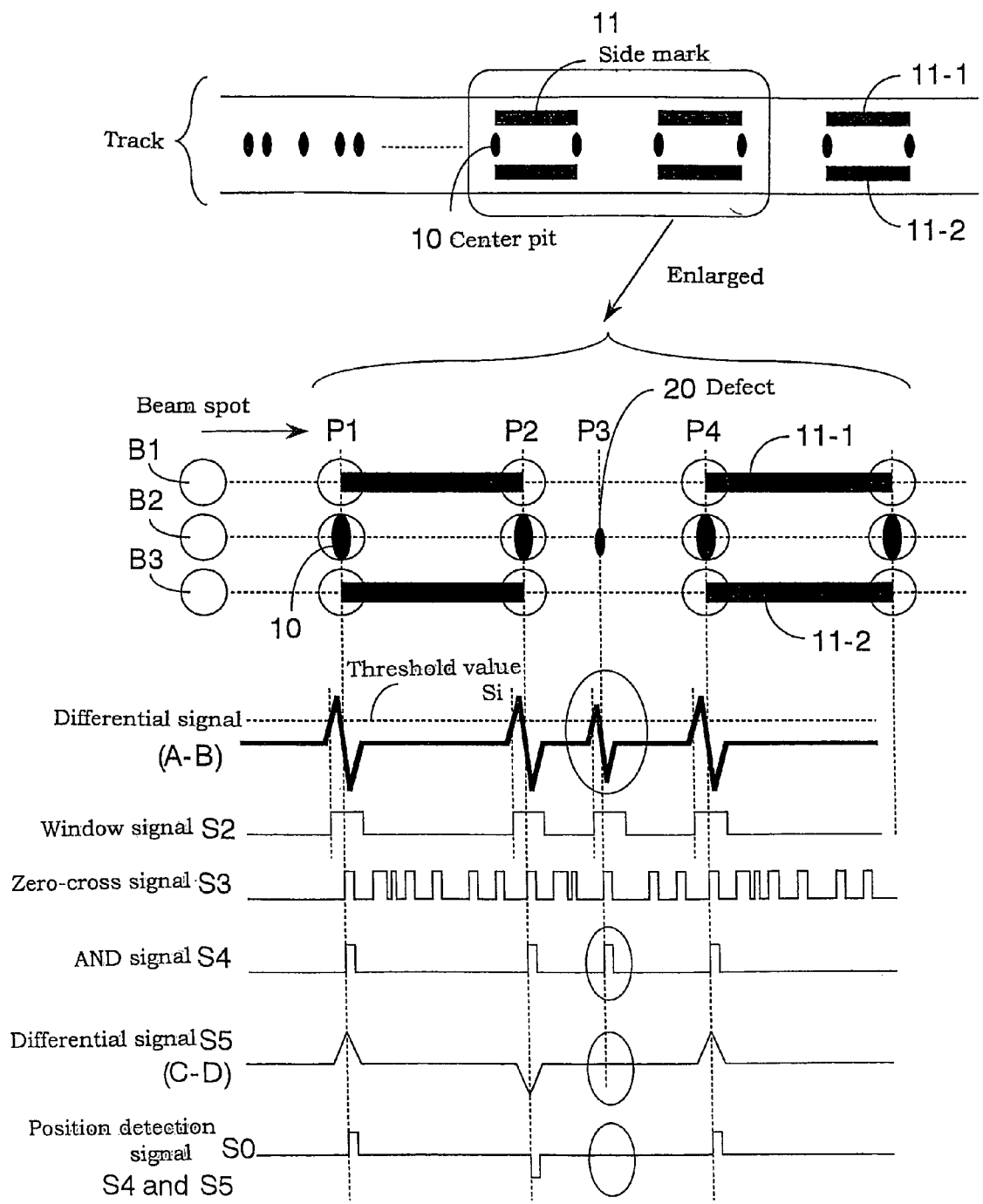
FIG. 3 is an explanatory diagram showing a position detection process according to the first embodiment of the present invention.

In addition, when the recording position and the like is confirmed, a plurality of light beams are used as will be described below. In the case of the medium shown in (c) of FIG. 1, three light beams (B1, B2 and B3) are used as shown in FIG. 3.

The three light beams (B1, B2 and B3) are applied in the vicinity of the side mark 11-1, center pit 10 and the side mark 11-2, respectively, and have a spot diameter smaller than that used in the recording process.

While one track is irradiated with such three light beams at the same time, the beams are moved from the left to the right in (c) of FIG. 1. When reflected lights of the three light beams are detected and analyzed, the center pit 10 of the target recording position can be found.

The side mark 11 is used to detect position displacement or avoid an erroneous detection which could occur when the center pit 10 of the target recording position is searched.

For example, an omission of the center pit 10 which is to exist originally or an erroneous detection of the center pit due to a defect 20 which is not to exist originally is found by the side mark 11. In addition, since the omission of the center pit 10 is detected with the dedicated light beams (B1, B2 and B3) which are different from the light beam for the recording process are used, it can be detected before the recording process or the reproducing process.

(Embodiment of Position Detection Patterns of Medium)

FIG. 2 shows some embodiments of the position detection patterns according to the present invention.

In FIG. 2, (a) shows an example in which rows of side marks 11-1 and 11-2 are provided on both sides of a row of center pits 10 in a track width direction, which is the same as (c) of FIG. 1.

Also in FIG. 2, (b) shows an example in which a row of a side mark 11-2 is provided only one side of a center pit 10 in a track width direction. Although the side mark 11-2 is provided on a lower side of the center pit 10 in (b) of FIG. 2, it may be provided on an upper side thereof.

Also in FIG. 2, (c) shows an example in which a center pit 10 does not exist and two rows of side marks 11-1 and 11-2 are provided. In this case, the side mark serves as the center pit 10.

Also in FIG. 2, (d) shows an example in which slits 12-1 and 12-2 provided to obtain a track error signal (TES) is also used as a side mark 11. Here, the TES slit 12 is not continuously formed and it may be arranged at regular intervals similar to (a) of FIG. 2.

Although the four embodiments of patterns are illustrated in FIG. 2; the patterns are not limited to these.

As shown in (b) or (c) of FIG. 2, since at least two pattern rows are to be provided, three side mark rows may be provided instead of one or two side mark rows.

(Explanation of Position Detection Process of Medium Having No Side Mark)

A description will be made of a medium having a track in which only the center pits are provided and there is no side mark before a description is made of the position detection process of the medium having the position detection patterns in (c) of FIG. 1 according to the present invention. According to such medium, there is a case the shifted position displacement cannot be detected as will be described below.

Figure 7A:
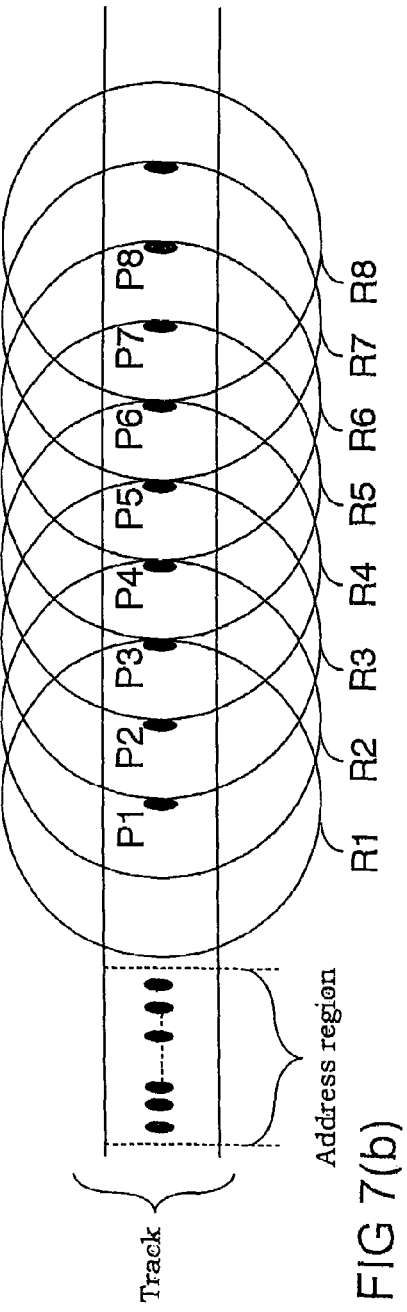
FIG. 7 is an explanatory diagram showing shifted position detection which becomes a problem in a general shifted recording method.
Figure 7B:
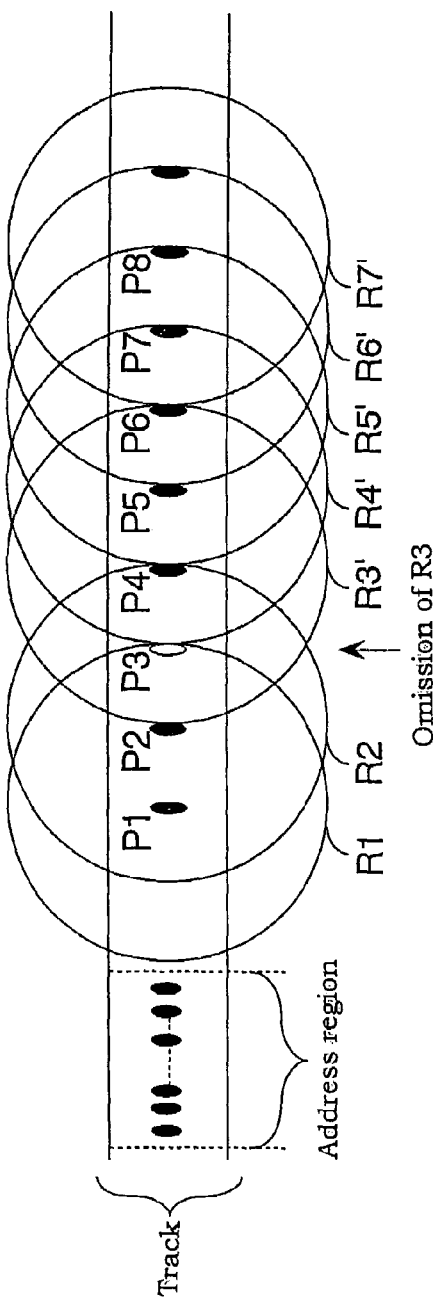

FIG. 7 shows an explanatory diagram showing shifted position detection of the holographic medium of a shifted recording type.

Here, there is no side mark 11 shown in (c) of FIG. 1 and a row of position markers P1 to P8 corresponding to the center pits 10 are provided in the track.

In FIG. 7, (a) shows a case the shifted position detection is normally performed.

While the light beam for detecting a position is moved from the left side of the track to sequentially detect the position markers. When a position of the first position marker P1 is irradiated with the light beam and it is determined that the position marker P1 exists by its reflected light, it is determined that the present position is in the shifted position P1.

For example, when a recording request to record data in an address corresponding to the position of the position marker P3 is provided, the three position markers are determined while the light is moved to the right direction. That is, three position markers are counted.

When it is determined that the number of the position markers is three, since it means that the position marker P3 to which the page data is recorded is detected, the recording process is prepared and the information light and the reference light are applied to a region of a beam spot R3 centered on the position marker P3 to record the page data therein. That is, the page data is correctly recorded in the target recording region shown by the circle R3 in (a) of FIG. 7.

In addition, when data is to be recorded in an address corresponding to a position of the position marker P8, for example, the number of the position markers is sequentially counted from the position marker P1 to P8 and confirm the position of the position marker P8.

Meanwhile, (b) of FIG. 7 shows a case a defect is generated in detecting the position marker. That is, the position marker P3 cannot be detected because a noise is generated in a detection signal or the position marker P3 to be formed previously has a defect in itself.

Although the position marker P3 is to be the third one from the left fundamentally, if the position marker P3 cannot be detected, it is erroneously determined that the next position marker P4 is the third one. That is, the position of the position marker P4 is erroneously determined as the position of the third position marker P3. At this time, the page data to be recorded in the recording region R3 centered on the P3 is recorded in a recording region R3' centered on the P4. That is, the page data cannot be recorded in the recording region R3. When the sifted recording is continued, page data to be recorded in a recording region centered on the P4 is recorded in a recording region R4' centered on the P5, so that the recording region is sequentially displaced in the right direction.

In a case the position marker P3 is not recognized at the time of recording and reproducing any more, the recording/reproducing could be normally performed under displaced conditions. However, in a case the position marker P3 cannot be recognized only at the time of recording temporally due to a stain on the medium and the like, a reproducing error occurs because the position marker P3 is normally recognized at the time of reproducing process.

As shown in (b) of FIG. 7, when only the row of the position markers P1 to P8 is formed and there is no side mark, since it cannot be detected that the shifted position is displaced, the recording/reproducing process could not be performed.

FIG. 8 is an explanatory diagram showing a shifted position detection in a case of recording method in which angular multiplexing and the shifted recording are combined. In this case also, it is assumed that there is no side mark and only position markers P1, P2, P3, . . . are formed.

As shown in (a) of FIG. 8, in a normal case, six pieces of page data R1 to R6 are recorded in a recording region centered on the position marker P1 by angular multiplexing.

Then, the recording position is shifted in the right direction so that the recording region may not overlap with each other. At this time, when the track is irradiated with the light for detecting the position marker and the next position marker P2 is detected, the next recording position is recognized. Then, six pieces of page data R7 to R12 are multiplex-recorded in a recording region centered on the position marker P2 by angular multiplexing.

Similarly, the next position marker P3 is detected and plural pieces of page data R13 to R18 are recorded by angular multiplexing.

Meanwhile, (b) of FIG. 8 shows a case the position marker P2 cannot be detected due to a stain or a signal noise.

In this case, since the position marker P2 cannot be detected, the detection light proceeds to the right direction and a position marker P2 which is to be recognized as the position marker P3 is erroneously recognized as the second position marker P2.

Therefore, six pieces of page data R7' to R12' which are to be recorded in the recording region centered on the position marker P2 are recorded in the recording region centered on the position marker P2'. In this case also, the displacement of the shifted position cannot be detected and the page data are erroneously recorded, so that a normal reproducing process could not be performed.

FIG. 9 is an explanatory diagram showing another shifted position detection in a recording method in which angular multiplexing and shifted recording are combined. In this case also, there is no side mark and a shifted position is detected by only one pit row including position markers P1, P2 and P3.

In FIG. 9, (a) shows a case the position is detected normally, which is the same as in (a) of FIG. 8.

Also in FIG. 9, (b) shows a case the position marker P2 cannot be detected due to a defect and a position marker P2' is detected in a position in which the position marker is not to exist fundamentally.

Although such displacement of the position marker P2 is generated due to a stain and the like in some cases, it is also generated due to a precision error of a shifted amount of the medium or a noise contained in a position detection signal.

According to this recording method, when the recording is performed by angular multiplexing, the medium is stopped. When the angular multiplexing is to be performed in the next recording region, the medium is shifted to that recording region and then the medium is stopped so that data is recorded by angular multiplexing. The above method in which the medium is stopped and moved sequentially while the data is recorded is called "stop & go" recording method.

In the case in (b) of FIG. 9, six pieces of page data R7' to R12' are recorded not in the recording regions R7 to R12 centered on the position marker P2 which is to be in the shifted position, but in a recording region centered on the position marker P2' which is displaced from the shifted position. In this example also, since it cannot be detected that the shifted position is displaced, the page data is recorded in the incorrect position and the normal reproducing process could not be performed.

Description has been made of the example in which the displacement of the shifted position cannot be detected when the position markers include only one row of pits.

Meanwhile, since the plurality of rows of position detection patterns including the side marks are formed in the medium according to the present invention, the displacement of the shifted position can be detected and high-precision recording and reproducing can be implemented as will be described with reference to FIGS. 3 and 6.

(Description of Position Detection Process According to First Embodiment of the Present Invention)

A description will be made of detection of recording and reproducing position with reference to FIG. 3.

FIG. 3 shows a position detection process in the case of the medium having the position detection patterns shown in FIG. (c) of 1. In this case, the three light beams B1, B2 and B3 are applied to the side mark 11-1, the center pit 10 and the side mark 11-2, respectively at the same time and their reflected light beams are detected by a beam detector (photodetector PD).

A signal is provided by detecting three reflected light beams and a position detection signal S0 and the like is generated from the signal by a subtracting or multiplying operation.

Since the displacement of the shifted position or a detection error of the center pit and the like can be recognized by analyzing the position detection signal S0 and the like, detection precision of the recording and reproducing position can be improved.

Figure 10:
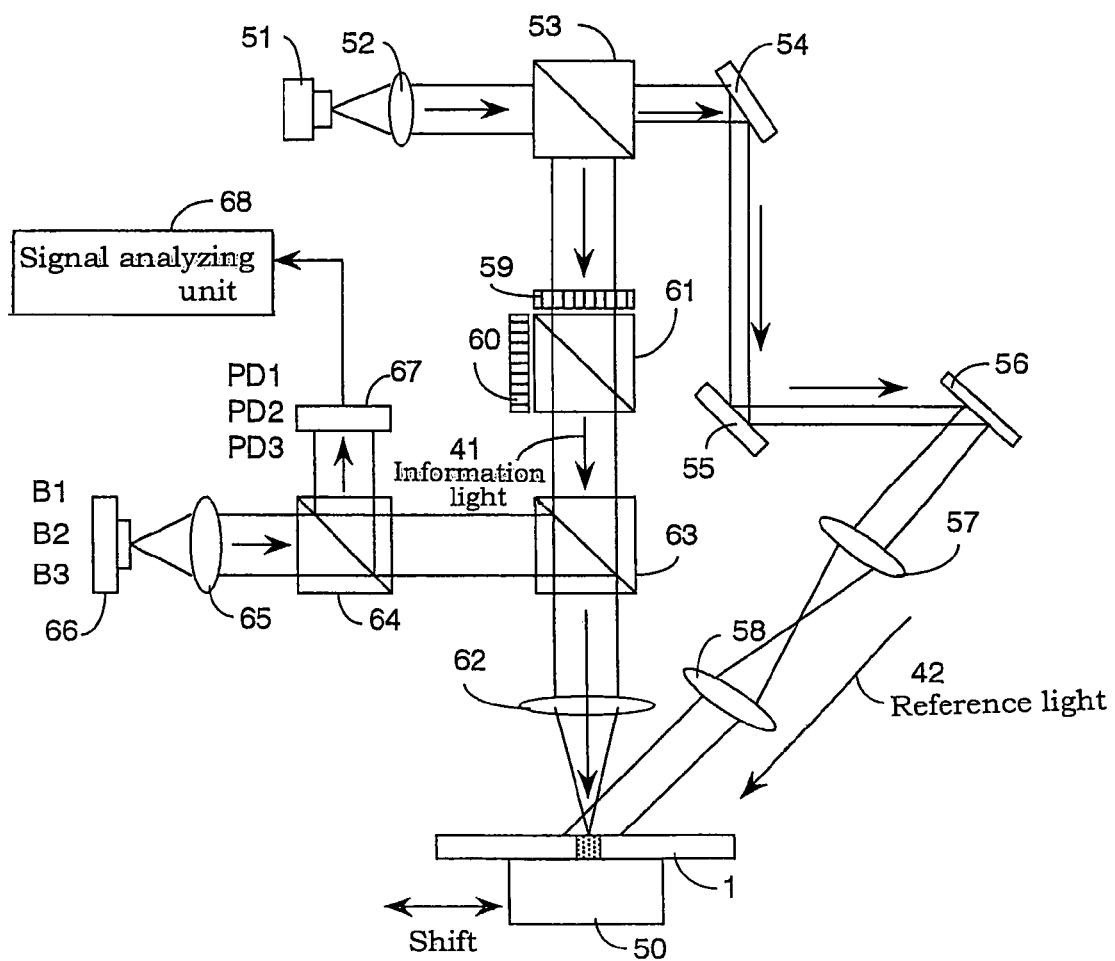
FIG. 10 is a block diagram showing a constitution of a recording and reproducing device used in the first embodiment of the present invention.

FIG. 10 shows a block diagram showing a constitution of a recording/reproducing device according to the first embodiment of the present invention.

Referring to FIG. 10, a light source 51, a group of lenses 52, 57, 58 and 62, a group of mirrors 54, 55 and 56, a spatial light modulator (SLM) 59, a charge coupled device (CCD) 60, and beam splitters BS 53 and 61 are components used in a holographic recording/reproducing process on the holographic recording medium 1.

At the time of recording, the light outputted from the recording and reproducing light source 51 is split by the BS 53, and one light is modulated by the spatial light modulator 59 to a light so as to correspond to the page data to be recorded and applied to the medium 1 as information light 41.

In addition, the other light passes through the group of mirrors 54, 55 and 56 and the lenses 57 and 58 and applied to the same position as that of the information light 41 on the medium as reference light 42. Then, the holographic recording of the page data is performed using mutual interference of the information light 41 and the reference light 42. At the time of reproducing, only the reference light 42 in FIG. 10 is applied to the medium and the reproducing light reflected from the medium passes through the BS 61 and it is detected by the CCD 60.

In addition, according to the shifted multiple recording method in which recording/reproducing is performed while the medium 1 is sequentially moved, a shifting mechanism 50 for the medium 1 is provided to move the medium 1 in the lateral direction as shown in FIG. 10.

According to the present invention, other than the above components required for the holographic recording/reproducing, servo components to align the medium with the recording/reproducing components are provided.

Referring to FIG. 10, the servo components include a light source 66, a convex lens 65, beam splitters 63 and 64, a beam detector 67 (PD1, PD2 and PD3), and a signal analyzing unit 68.

Three sets of the light source 66, the convex lens 65, the BS 64, the beam detector 67 may be provided so that each set may be provided for each pathway of the three light beams B1, B2 and B3. However, since the three light beams B1, B2 and B3 are outputted at the same time, only one servo light source 66 is provided and one outputted light may be split to three light beams by the beam splitter BS.

For example, the light beam B1 outputted from the light source 66 passes through the lens 65, the BSs 64 and 63, and the lens 62 and applied to the region including the side mark 11-1 on the track of the medium 1, and its reflected light beam is inputted to the PD1 of the beam detector 67 through a reverse route.

The light beam B2 is applied to the region including the center pit 10 on the track through the same route and its reflected light is inputted to the PD2 of the beam detector 67.

The light beam B3 is applied to the region including the side mark 11-2 on the track through the same route and its reflected light is inputted to the PD3 of the beam detector 67.

The signal analyzing unit 68 receives the light signals detected by the PD1, PD2 and PD3 of the beam detector 67 and generates a position detection signal by a subtracting or multiplying operation. The signal analyzing unit 68 provides a microcomputer including a CPU, a memory, a timer, an I/O controller and the like.

FIG. 4 is an explanatory diagram showing a light detection surface of the beam detector according to one embodiment of the present invention.

Each surface of the light detection surfaces of the beam detectors (PD1, PD2 and PD3) according to the present invention is divided into two. For example, the detection surface of the beam detector PD2 for detecting the center beam B2 applied to the center pit is divided into a region A and a region B.

Here, a boundary between the regions A and B is directed in a track width direction (a direction perpendicular to the row of the center pit), so that the center beam B2 enters the region A of the detection surface from the left and leaves the region B from the right.

Similarly, each of the detection surfaces of the beam detectors PD1 and PD3 for detecting the side beams B1 and B3 to be applied to the side marks 11-1 and 11-2, respectively is divided into two regions C and D, and its boundary extends in the track width direction and each of the beams B1 and B3 enters the region C from the left and leaves the region D from the right.

For example, when it is assumed that the present position of the spot of the light beam is in the position P1 shown in FIG. 3, the beam B1 is applied to the region including the left end of the side mark 11-1 and the beam B2 is applied to the region including the center pit 10 completely, and the beam B3 is applied to the region including the left end of the side mark 11-2.

When it is assumed that the same amount of light is detected in the regions A and B of the detection surface of the PD2 to detect the beam B2, the differential signal S1 (A−B) becomes zero in this position P1.

In addition, considering the vicinity of the position P1, a variation of the differential signal S1 (A−B) provided from the regions A and B of the PD2 by the beam B2 becomes a waveform having a maximum and a minimum as shown in FIG. 3.

Meanwhile, when it is assumed that the light is detected only in the region C of the detection surface in the beam detectors PD1 and PD3 to detect the beams B1 and B3 and the light is not detected in the region D in the position P1, its differential signal S5 (C−D) becomes maximum in the position P1. Considering the vicinity of the position P1, the differential signal S5 (C−D) becomes a waveform having a maximum peak as shown in FIG. 3.

Referring to FIG. 3, a window signal S2 is a pulse signal which is generated for a certain period when the differential signal S1 exceeds a predetermined threshold value S1. Here, the certain period is previously set so that it is a little longer than a period while the maximum and minimum peaks of the differential signal are generated.

A zero-cross signal S3 is a pulse signal which is generated when the differential signal S1 becomes zero. Since the differential signal S1 is not always zero in general and it sways around zero, the zero-cross signal is generated as the pulse signal in a position other than the positions P1 and P2.

An AND signal S4 is a signal provided by logical multiplication of the window signal S2 and the zero-cross signal S3. Since both signals S2 and S3 are in a high state in the vicinity of the position P1, the AND signal S4 is generated as a pulse signal as shown in FIG. 3.

The position detection signal S0 with positive or negative signs is provided by logical multiplication of the AND signal S4 and a differential signal S5 (C−D). A positive pulse signal is outputted as the position detection signal S0 in the position P1.

FIG. 3 shows a case where a defect 20 which is erroneously detected as the center pit exists in the position P3. When the medium does not have the defect 20, the center pits 10 can be recognized correctly also in the positions P2 and P4 and the page data to be recorded can be correctly recorded in the target recording position centered on each center pit.

In this case, the differential signal S1 (A−B) detected by the PD2 and the differential signal S5 (C−D) detected by the PDs 1 and 3 are varied as shown in (a) of FIG. 5. The differential signal S5 is varied similar to the position detection signal S0. That is, the differential signals S1 are correctly detected in the positions P1, P2 and P4 in which the center pit exists, and the value of the differential signal S5 is varied such as "1, −1, 1" and correctly detected.

Meanwhile, in the case where the defect 20 exists in the position P3 between the positions P2 and P4 as shown in FIG. 3, when it is assumed that the detect 20 is detected by the center beam B2 in the position P3 as the center pit 10, its differential signal S1 (A−B) is outputted.

Therefore, a pulse waveform of the AND signal S4 provided from the differential signal S1 is outputted in the position P3.

If there is no side mark nor differential signal S5, since the AND signal S4 is used as the position detection signal, the position P3 is determined as the position in which the third center pit exists, which is an erroneous detection of the shifted position. That is, the page data is recorded in the recording region centered on the position P3 incorrectly.

However, according to the present invention, since the differential signal S5 (C−D) of the side mark 11 is used, the position detection signal S0 is provided, so that the defect 20 is not recognized as the center pit 10 and the center pit in the next position P4 is correctly detected as the shifted position.

Since the side mark does not exist in the vicinity of the position P3 in FIG. 3, the differential signal S5 is still zero in the position P3 and the signal is not outputted. Therefore, the position detection signal S0 provided by the logical multiplication of the signals S4 and S5 is still zero in the position P3.

In FIG. 5, (b) shows a variation of the differential signal when the defect 20 exists as shown in FIG. 3.

Referring to (b) of FIG. 5, although the center pits are detected in four positions including the position P3 of the defect 20 in the differential signal S1, the center pit is not detected in the position P3 having the defect 20 and center pits are correctly detected in the positions P1, P2 and P4 in which the center pits exist in the differential signal S5 and the position detection signal S0.

As described above, even when the defect 20 which could be erroneously recognized as the center pit exists as shown in FIG. 3, since the medium according to the present invention includes the side mark row in the track width direction in addition to the center pit row, the erroneous recognition due to the defect can be avoided.

Next, a description will be made of a position detection process to be performed when the center pit 10 to be detected could not be detected with reference to FIG. 6.

Figure 6:
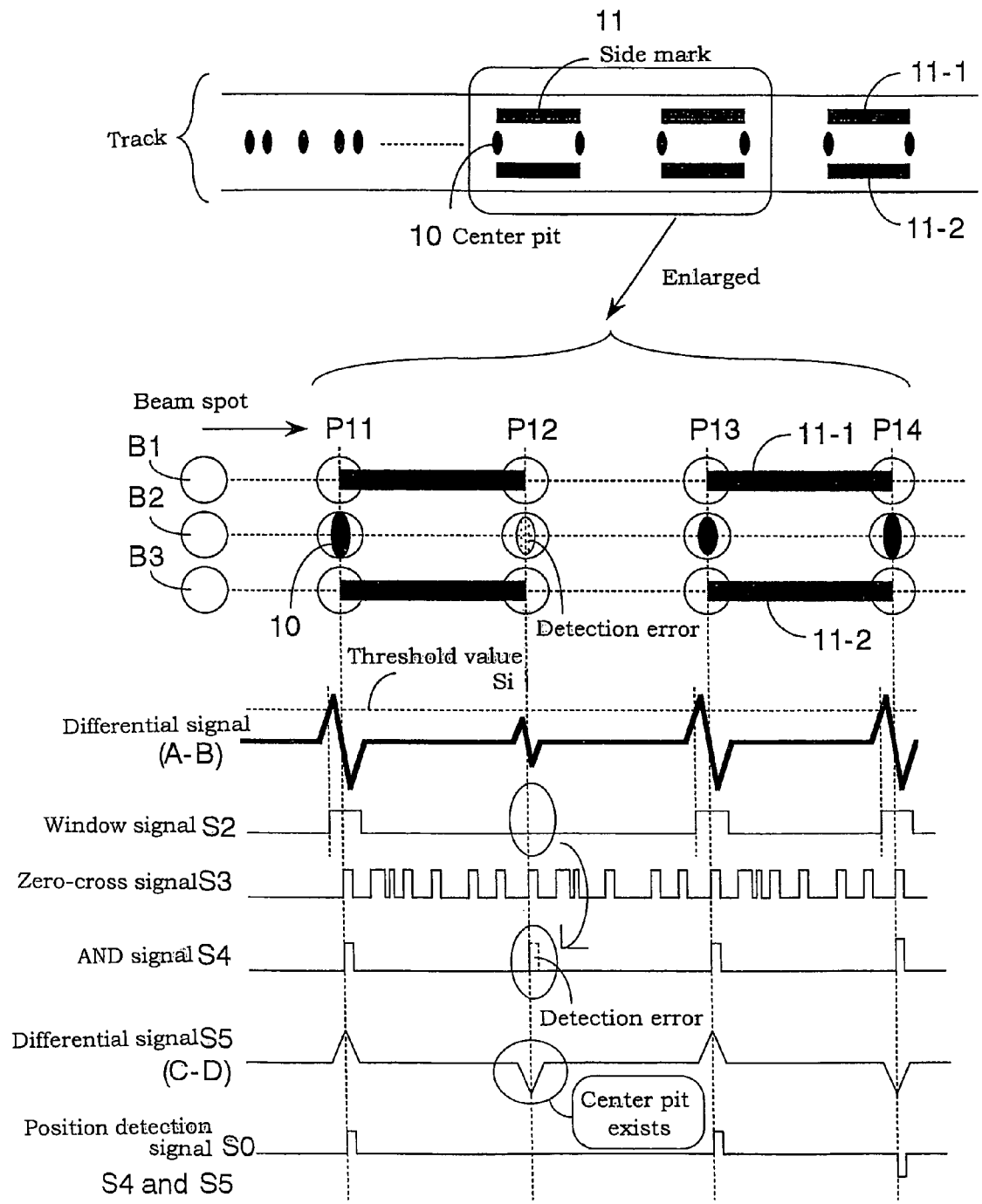
FIG. 6 is an explanatory diagram showing a position detection process in an abnormal case according to the first embodiment of the present invention.

FIG. 6 shows a case where a center pit in a position P12 is omitted due to a detection error. In this case also, it is assumed that position detection patterns are the same as those shown in (c) of FIG. 1 and three light beams B1, B2 and B3 are applied.

In addition, it is assumed that the center pit 10 in the position P12 is not completely omitted but it is a defective pit having a defect partially. However, even when it is completely omitted, the same process is performed.

Referring to FIG. 6, a differential signal S1 (A–B) is detected in each of the normal center pits 10 in positions P11, P13 and P14.

In addition, the AND signal S4, the differential signal S5 and the position detection signal S0 are generated in each of the above positions P11, P13 and P14 similar to those shown in FIG. 3. Thus, the positions P11, P13 and P14 are recognized as the positions in which the center pits 10 exist.

Meanwhile, since the center pit 10 in the position P12 is defective, it is assumed that only a relatively small differential signal S1 (A–B) is provided. When this relatively small differential signal S1 (A–B) is smaller than the threshold value S1, the window signal S2 is not generated in the position P12. Therefore, the AND signal S4 and the position detection signal S0 are not generated in the position P12 because of such detection error.

However, since the position P12 corresponds to right ends of the side marks 11-1 and 11-2, a negative differential signal S5 (C–D) is generated in the position P12 as shown in FIG. 6.

FIG. 12 shows variations of the differential signals S1 and S5 and the position detection signal S0 in the case shown in FIG. 6.

In FIG. 12, (a) shows the case in which the center pits 10 normally exist in the four positions P11, P12, P13 and P14. In this case, the differential signal S1 (A–B) is normally generated in each of the four positions and the positive and negative differential signal S5 (C–D) is generated so as to be alternately converted.

Meanwhile, (b) of FIG. 12 shows the case in which the center pit 10 in the position P12 is defective. In this case, although the differential signals S1 and S5 are varied like in (a) of FIG. 12 in the positions P11, P13 and P14, the differential signal S1 and the position detection signal S0 are not generated and the negative differential signal S5 (C–D) is generated in the position P12.

Here, according to the differential signal S5(C–D) in FIG. (b) of 12, its signs are alternately varied such that "1, –1, 1 and –1", and the negative signal is generated in the position P12 in which the differential signal S1 (A–B) is zero, which means that the center pit 10 originally exists in the position P12 at the right end of the side mark 11. That is, it shows that the center pit which exists originally in the position P12 could not be detected.

Therefore, while the light beam is moved from the left side of the track, it is found that there is a chance that the right end of the side mark 11 and the center pit 10 exist in the position P12 by analyzing the variation of the differential signal S5 (C–D).

While the light beam is further moved in the right direction, it is found that two differential signals S1 and S5 are generated in the position P13 and the differential signal S5 (C–D) is varied such that "1, –1 and 1".

Thus, since it is found that the center pit 10 exists in the position P13 and it corresponds to the left end of the side mark 11, it is determined that the center pit 10 exists at the right end of the side mark 11 on the left side of the position P13 and that center pit exists in the position P12.

That is, even when one center pit is defective, the position of the center pit which could not be detected due to the detection error can be recognized by the side mark 11.

In addition, it can be recognized before the page data is actually recorded in the recording region centered on the center pit in the position P13.

When the side mark 11 is not provided, since the differential signal S5 is not generated, the center pit in the position P13 is erroneously recognized as the second center pit and the page data is recorded in the incorrect position. However, according to the present invention, since the differential signal S5 is analyzed before the page data is actually recorded, even in the case shown in FIG. 6, the page data is not recorded in the incorrect position.

In addition, when it is recognized in the position P13 that the center pit 10 in the position P12 is omitted, the position irradiated with the light beam is moved back to the position P12 and the differential signal in the position P12 is analyzed again to reconfirm the existence of the center pit.

When the existence of the center pit in the position P12 is confirmed by that reconfirmation, the page data is recorded in the recording region centered on the position P12. In addition, when the center pit in the position P12 cannot be confirmed even after several reconfirmation are performed, a user may be informed of a recording error or a reproducing error.

As described above, according to the medium in the present invention, even when the center pit is omitted as shown in FIG. 6, an erroneous detection and an erroneous recording can be avoided.

The description has been made of the position detection process when one center pit is omitted with reference to FIG. 6. However, according to the medium having the above position detection patterns, the erroneous detection can be avoided when one center pit is omitted but when two center pits are sequentially omitted (in the positions P12 and P13, for example), an erroneous detection could occur.

Next, a description will be made of an example in which a detection error can be recognized when two center pits are sequentially omitted.

Figure 11:
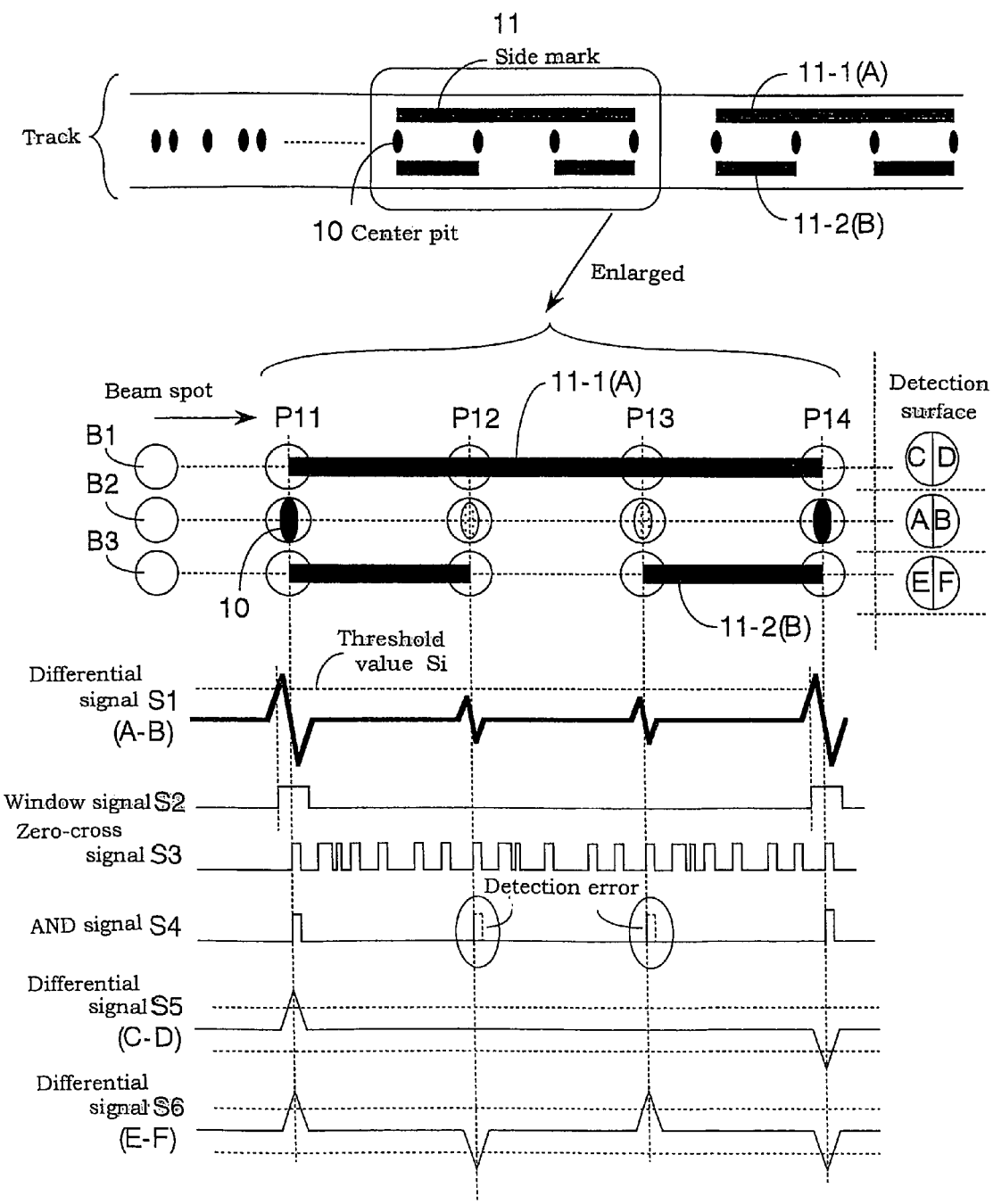
FIG. 11 is an explanatory diagram showing a position detection process when two position detection patterns are sequentially omitted according to the present invention.

FIG. 11 is an explanatory diagram in the case two position detection patterns (center pits) are sequentially omitted.

In FIG. 11, a pattern of one side mark 11-1 among the position detection patterns is different from that shown in (c) of FIG. 1 and the like. A center pit 10 and its lower side mark (B) 11-2 are the same as those in (c) of FIG. 1.

The side mark (A) 11-1 positioned on the upper side of the center pit 10 is a linear pattern existing above four center pits P11 to P14 and has a length corresponding to a length from the center pits P11 to P14, that is, a length which is almost three times as long as the interval of the center pits.

In addition, the interval of the side mark 11-1 and the next side mark 11-2 is the same interval of the center pits (one pitch of the center pit 10).

In other words, a left end of the side mark 11-1 is above the center pit P11 and its right end is above the third center pit P14 from the center pit P11.

In the case of FIG. 11, three light beams B1, B2 and B3 are used and a beam detector having a detection surface shown in FIG. 4 is used like the embodiment in FIG. 3 and the like. However, since the patterns of the two side marks 11-1 and 11-2 are different, the description will be made by setting the regions of the detection surfaces of the beam detector PD1 to detect the beam B1 to "C" and "D" and setting the regions of the detection surfaces of the beam detector PD3 to detect the beam B3 to "E" and "F".

A differential signal S5 (C–D) in FIG. 11 is a signal provided from a beam detector PD1 to detect the light applied to the side mark 11-1. Meanwhile, a differential signal S6 (E–F) in FIG. 11 is a signal provided from a beam detector PD3 to detect the light applied to the side mark 11-2.

In addition, in this example, omissions of the sequential two center pits are detected using signal variation of the three differential signals S1, S5 and S6.

FIG. 13 shows variations of the differential signals in the case of the position detection process shown in FIG. 11.

In FIG. 13, (a) shows variations of the differential signals S1, S5 and S6 when the center pits in the four positions P11 to P14 are not omitted and their positions are correctly detected.

Here, since the side mark 11-1 continuously exists in the positions P12 and P13, the differential signal S5 (C–D) is not outputted.

Meanwhile, since the side mark 11-2 is not continued in the positions P12 and P13, a negative or positive differential signal S6 (E–F) is outputted. That is, its sign is negative in the position P12 and its sign is positive in the position P13.

In FIG. 13, (b) shows a case where the center pits 10 are sequentially defective in the positions P12 and P13 and a detection error occurred.

Even in the abnormal case shown in (b) of FIG. 13, variations of the differential signals S5 and S6 corresponding to the side marks are the same as in (a) of FIG. 13. However, since the center pits 10 cannot be sufficiently detected in the positions S12 and S13, the differential signal S1 (A–B) is detected only a little. Here, it is assumed that the differential signal S1 smaller than the threshold value S1 is detected in the positions P12 and P13.

In this case, an AND signal S4 is not also outputted in the positions P12 and P13. This means that a detection error cannot be recognized in a case there is no side mark 11 and only the center pit 10 is detected.

However, according to the present invention in FIG. 11, it can be recognized that the two sequential center pits are omitted by analyzing variations of the three differential signals.

In the normal case in (a) of FIG. 13, the outputs of the three differential signals S1, S5 and S6 in the position P11 of the first center pit are "1, 1 and 1", and the outputs of the three differential signals S1, S5 and S6 in the position P12 of the second center pit are "1, 0 and 1".

Meanwhile, in the abnormal case in (b) of FIG. 13, the outputs of the three differential signals S1, S5 and S6 in the position P11 of the first center pit are "1, 1 and 1", which are the same in (a) of FIG. 13. However, both outputs of the differential signals S5 and S6 in the position P14 of the second center pit 10 found by the differential signal S1 are "–1".

That is, the output of the differential signal S5 is different in the position in which it is recognized as the second center pit (the position P12 in (a) of FIG. 13 and the position P14 in (b) of FIG. 13). In other words, a variation of the differential signal S5 in the positions P11 and P12 (from 1 to 0) in the normal case shown in (a) of FIG. 13 differs from the variation of the differential signal S5 in the positions P11 and P14 (from 1 to –1) in the abnormal case in (b) of FIG. 13.

Therefore, in the abnormal case in (b) of FIG. 13, when the second center pit is detected in the position P14, since the variation of the differential signal S5 (from 1 to –1) is different from the variation of the differential signal S5 (from 1 to 0) in the normal case, it can be recognized that the position detection in which the second center pit exists in the position P14 is an error and a detection error of two omissions occurred.

Therefore, since it can be recognized that the error occurred in detecting the position before the page data which is to be recorded in the position P12 originally is recorded in the recording region centered on the position P14, the page data is prevented from being recorded in the position P14 erroneously.

Thus, when it is recognized that the error occurred in the position detection, the position irradiated with the light beam is moved backward to the positions P12 and P13 and the differential signal and the like is reconfirmed. As a result of the reconfirmation, when the signal variation shown in (a) of FIG. 13 is obtained, the subsequent recording or reproducing may be carried out.

Meanwhile, when the normal signal variation shown in (a) of FIG. 13 cannot be obtained as the result of reconfirmation, a user may be informed of the recording error or the reproducing error.

Although the side mark A above the center pit has the length which is almost three times as long as the interval of the center pit and the interval of the side marks B below the center pit is almost the same as that of the center pits in the example shown in FIG. 11, as another example, like in FIG. 14, both of the side marks A and B may have a length which is almost three times as long as the interval of the center pits, and they are arranged such that both ends of the side mark A or the side mark B may be arranged in a position corresponding to the position of the center pit in the track width direction and a left end of the side mark A does not coincide with a left end of the side mark B and a right end of the side mark A does not coincide with a right end of the side mark B.

Figure 14:
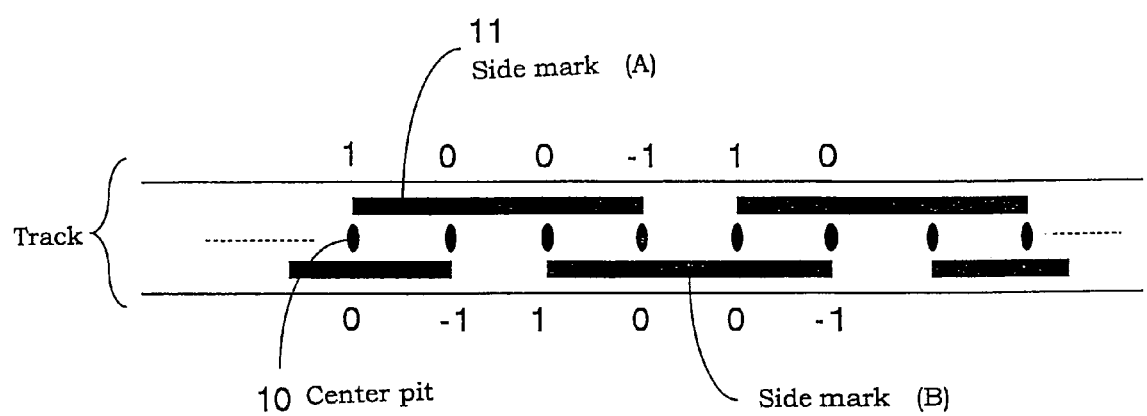
FIG. 14 is an explanatory diagram showing arrangement of another position detection patterns according to the first embodiment of the present invention.

Although the left ends of the side marks A and B are shifted by two center pits in FIG. 14, side marks A and B only have to be arranged such that each end corresponds to the position of the center pit in the track width direction and the left end of the side mark A does not coincide with the left end of the side mark B and the right end of the side mark A does not coincide with the right end of the side mark B. For example, the left ends of the side mark A and the side mark B are shifted by one center pit, or the left end of the side mark A coincides with the right end of the side mark B and the right end of the side mark A coincides with the left end of the side mark B.

In the above constitution, similar to the case shown in FIG. 11, the omissions of two sequential center pits can be detected by using the signal variations of the differential signals S5 and S6 provided from the beam spots B1 and B3 toward the side mark A and the side mark B corresponding to the center pits in the track width direction. More specifically, a combination of the signal variations of the differential signals S5 and S6 in the position corresponding to the center pit according to the present invention is so constituted that the same combination is generated every positions corresponding to the four adjacent center pits. In other words, the combination of the signal variation of the differential signals S5 and S6 in a position corresponding to each center pit has uniqueness. Therefore, each center pit can be uniquely specified in a relation of the four adjacent center pits. Thus, the omissions of the two adjacent center pits can be detected using the signal variations of the differential signals S5 and S6 in the position corresponding to each center pit.

The position detection process according to the first embodiment of the present invention has been described. According to the above, even when the center pit is defective, incorrect position detection can be avoided before the page data is actually recorded/reproduced, so that precision of the detection of the recording/reproducing position can be improved.

(Constitution of Medium According to Second Embodiment of The Present Invention)

Figure 15:
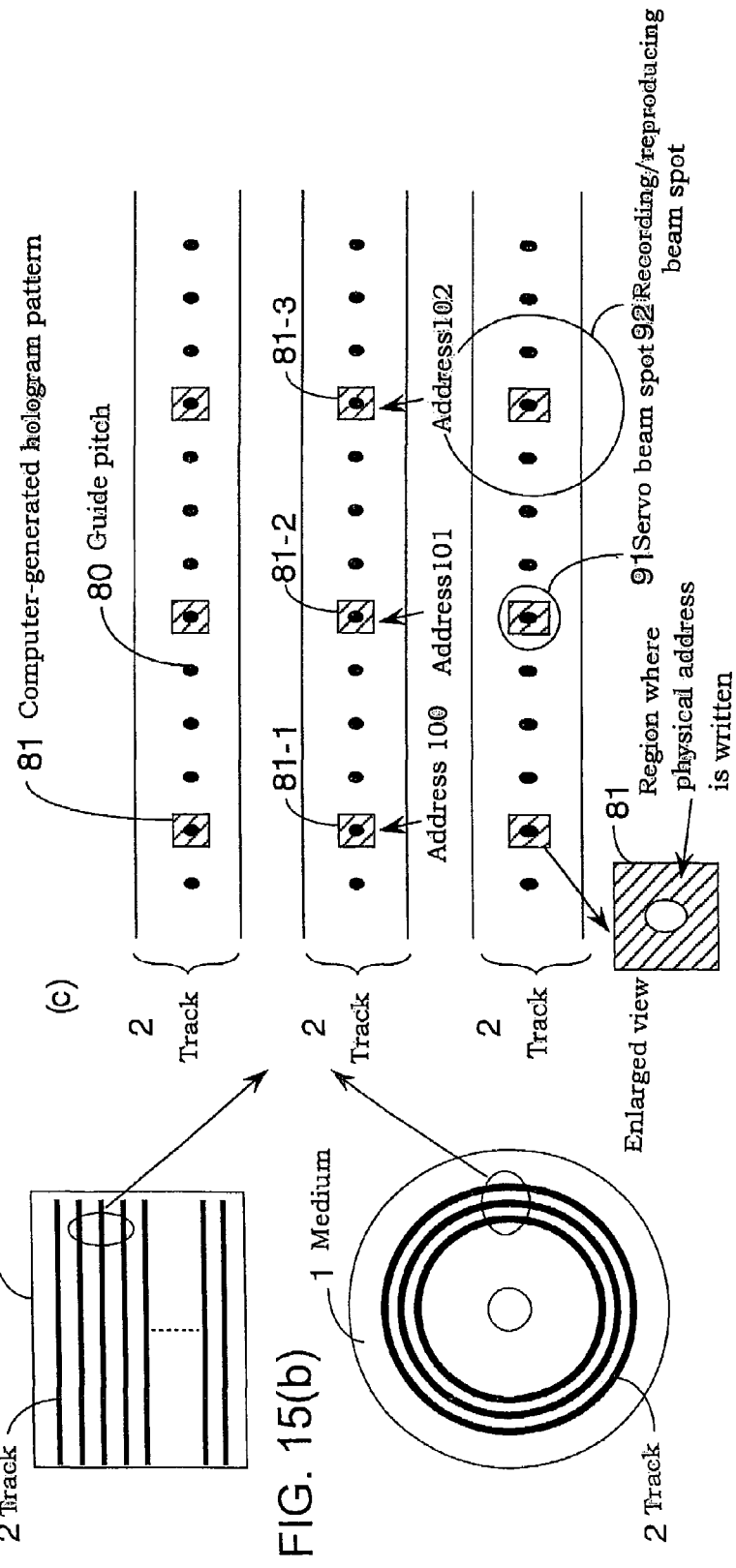
FIG. 15 is an explanatory diagram showing a position detection patterns according to a second embodiment of the present invention.

FIG. 15 shows a constitution of position detection patterns of a holographic medium according to a second embodiment of the present invention.

In FIG. 15, (c) is an enlarged view showing a region of three adjacent tracks 2 formed on the medium. Also in FIG. 15, (a) and (b) show medium configuration examples. According to the second embodiment, the position detection patterns include one row of patterns which include a plurality of guide pitches, and computer-generated hologram patterns.

Referring to (c) of FIG. 15, one row of guide pitches 80 are formed in a track direction in almost the center of each track 2 at regular intervals in its width direction.

The guide pitches 80 are to confirm a position in the track and formed as projections or recesses, in which address information is not contained.

The position of each guide pitch is a reference position of a region in which the page data is recorded/reproduced.

In addition, as shown in (c) of FIG. 15, a computer-generated hologram pattern 81 is formed every predetermined number of guide pitches 80.

The computer-generated hologram pattern 81 is a two-dimensional pattern in which information to specify a physical address in its position is previously recorded, and more specifically, it is a fine indented pattern.

In addition, the computer-generated pattern 81 corresponds to an interference pattern of page data recorded in a holographic recording medium. When the pattern 81 is irradiated with a reference light, the page data recorded here can be reproduced.

In general, the interference pattern recorded by applying information light which reflects page data and reference light at the same time is uniquely specified, and a physically indented pattern corresponding to the interference pattern can be formed by a certain operation of a computer. According to the computer-generated hologram pattern 81, the physically intended pattern which is provided by the operation of the computer is formed on the medium.

However, according to the present invention, information reproduced by applying the reference light to the computer-generated hologram pattern 81 shown in FIG. 15 is not page data such as user data but a physical address of the position in which the pattern 81 is formed.

For example, as shown in FIG. 15, in a case the physical addresses of positions 81-1, 81-2 and 81-3 of the computer-generated hologram patterns are set to 100, 101 and 102, respectively, when the reproducing light provided by irradiating the computer-generated hologram pattern in the position 81-2 with the reference light is decoded, the physical address 101 is reproduced.

That is, according to the second embodiment, the physical address itself on the medium in which the user data is to be recorded or reproduced is read out by using the guide pitch 80 and the computer-generated hologram pattern 81 before the user data is recorded or reproduced.

When the readout present physical address coincides with a target physical address provided by a recording request or a reproducing request, a recording region centered on the pattern 81 in which the physical address is written is irradiated with the light beam for recording or the light beam for reproducing, so that the requested user data is recorded or reproduced.

A beam spot (servo beam spot) 91 used to detect the physical address according to the second embodiment has a size which can include a computer-generated hologram pattern and may be smaller than a beam spot 92 for recording and reproducing the page data.

The computer-generated hologram pattern 81 may be provided between every adjacent guide pitches 80. However, since the recording capacity of the hologram medium is considerably large as compared with a conventional optical disk and the like, it is not efficient and it is actually difficult that the physical addresses are provided every adjacent guide pitches 80, so that it is preferable that the computer-generated hologram patterns 81 are provided every certain number of guide pitches 80 apart from each other with a certain distance as shown in FIG. 15.

It cannot be uniquely decided that how often the patterns 81 are formed, it should be set based on recording capacity or an ability of recording process and the like. However, when generation of a defect of the guide pitch 80 or an error of detection thereof is considered, it is preferable that the computer-generated hologram patters 81 are provided between every adjacent guide pitches 80 in view of improving precision of the position detection of the physical address.

In addition, since the position of the physical address is detected in the medium according to the second embodiment shown in FIG. 15, so-called "stop & go" detecting method is used. That is, to confirm the guide pitch 80, when a predetermined number of guide pitches 80 are detected and the position in which the predetermined pattern 81 exists is confirmed by moving light beam for detecting the position on the track, a moving operation is stopped. In a state the medium is stopped, the pattern 81 is irradiated with the reference light and the physical address is read out using reflected reproducing light. At this time, the reproducing light is decoded by a CCD.

In addition, the guide pitch 80 and the computer-generated hologram pattern 81 shown in FIG. 15 are fixedly formed before shipment so as not to be changed.

Figure 16:
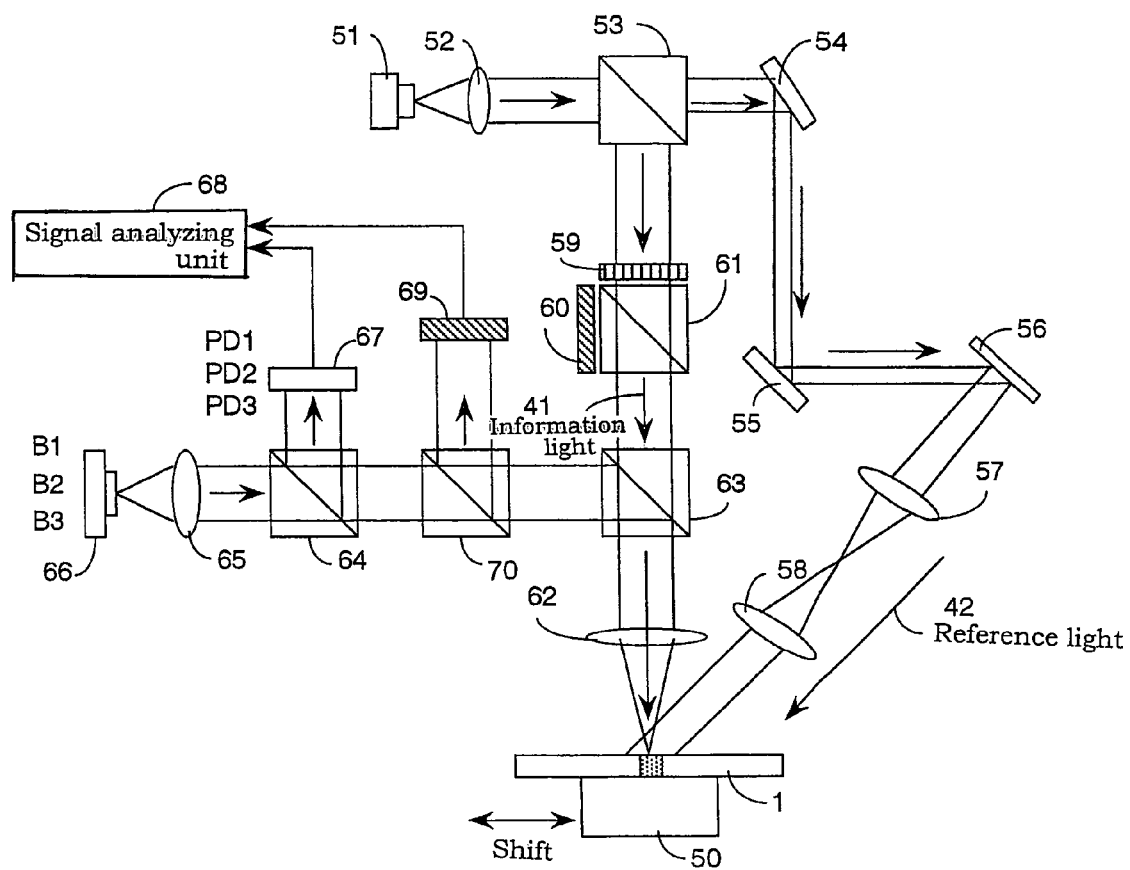
FIG. 16 is a block diagram showing a constitution of a recording and reproducing device used in the second embodiment of the present invention.

FIG. 16 is a block diagram showing a constitution of a recording and reproducing device according to the second embodiment of the present invention.

Here, blocks 51 to 62 to carry out the holographic recording and reproducing are the same as those shown in FIG. 10. The second embodiment is different from that shown in FIG. 10 in that beam splitters BS 63 and 70 and a CCD 69 are added.

When the physical address recorded in the pattern 81 is read out, the medium 1 is irradiated with the reference light 42 and its reproducing light passes through the BS 63 and 70 and it is inputted to the CCD 69. The above-described reproduction of the physical address is performed by a signal analyzing unit 68.

According to the second embodiment, since the physical address recorded in the track previously is read out directly, a recording and reproducing position can be detected with higher precision as compared with the medium in which only one row of the position markers is provided as shown in FIG. 7.

In addition, as shown in FIG. 16, the same components 64, 65, 66 and 67 may be provided similar to those in FIG. 10. In this case, a plurality of rows of position detection patterns may be provided in the track of the medium similar to those in (c) of FIG. 1 or FIG. 2.

That is, when both position detection patters 10 and 11 according to the first embodiment and computer-generated hologram pattern 81 are provided in the track of the holographic recording medium and the recording or reproducing position is detected, the position can be detected with higher precision.

(Constitution of Medium According to Third Embodiment of the Present Invention)

Figure 17:
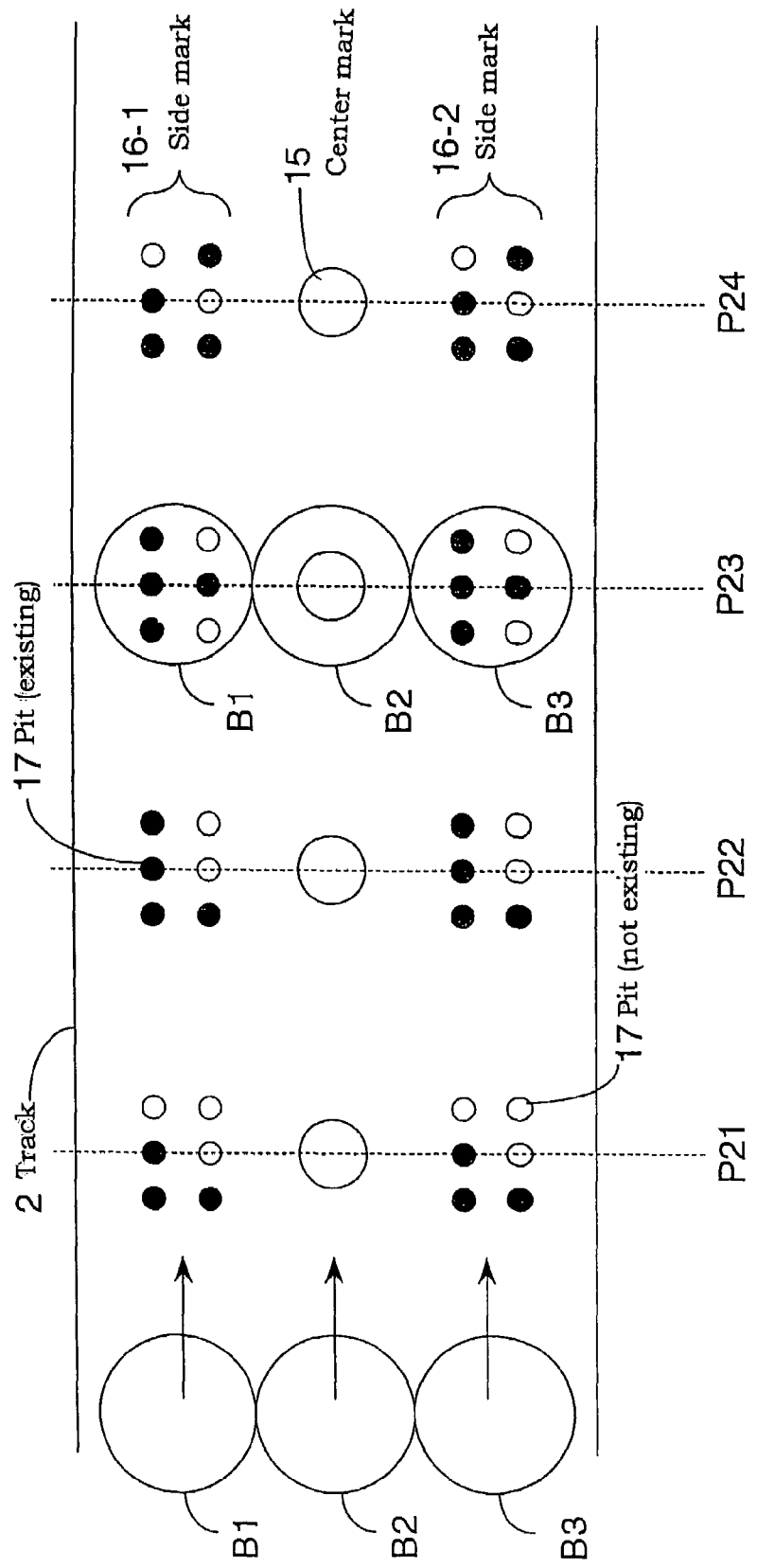
FIG. 17 is an explanatory diagram showing position detection patterns according to a third embodiment of the present invention.

FIG. 17 shows a constitution of position detection patterns of a holographic medium according to a third embodiment of the present invention.

Here, the position detection patterns in a track 2 include three rows of patterns 15, 16-1 and 16-2.

Although a point that the three rows of patterns are formed is similar to that in (c) of FIG. 1, a point that one of the side marks 16-1 and 16-2 includes a plurality of pits is different.

The center marks 15 in the center of the track 2 are arranged at regular intervals and they have an indented configuration and have no address information similar to the center pit shown in (c) of FIG. 1, which may be used both for focus control and tracking control.

The rows of the side marks 16-1 and 16-2 corresponding to the second detection mark row are arranged in the vicinity of the center marks 15 provided at regular intervals in a track width direction. Each side mark includes the plurality of pits. It is assumed that each pit is smaller than the center mark 15.

According to FIG. 17, one of the side marks 16-1 and 16-2 includes six pits 17. However, the number of the pits 17 to form one side mark is not limited to six.

In addition, the pits are constituted such that arrangement of the six pits 17 can specify a physical address of its position. A black circular mark designates a position in which the pit is formed and a white circular mark designates a position in which the pit is not formed in FIG. 17.

That is, the arrangement of the pits which constitute the side mark 16 is different from each other and it corresponds to a physical address specific to the side mark 16. The physical address can be recognized depending on the arrangement of the pits. For example, a physical address of a position P21 is specified by arrangement of three pits 17 as shown in FIG. 17 and physical addresses of positions P22, P23 and P24 are specified by arrangement of four pits 17 as shown in FIG. 17.

In addition, when one side mark 16 includes the six pits, the number of addresses which is two raised to the power of six can be specified in principle. When the side mark 16 includes four pits, the number of addresses which is two raised to the power of four can be specified. Therefore, the number of pits which constitute one side mark may be decided in view of recording capacity in the track and the like.

In addition, although three rows of position detection marks are shown in FIG. 17, two rows of marks may be used. For example, the position detection marks may include the center mark row 15 and the side mark row 16-1.

When the three rows of position detection marks are provided as shown in FIG. 17, three light beams B1, B2 and B3 to detect the mark rows, respectively are used similar to the case shown in FIG. 3.

For example, the light beam B1 is a beam spot having a size which can include all of the pit group which constitute the side mark 16-1, and the light beam B2 is a beam spot having a size which can include the center mark 15 completely.

While the three light beams are moved in the track direction, the recording position and the like is recognized and the recording/reproducing process of the page data is performed based on a position of the detected center mark. In addition, according to the third embodiment, the same recording and reproducing device as shown in FIG. 10 is used.

Although each detection surface of the beam detectors PD1, PD2 and PD3 to detect the three light beams B1, B2 and B3 shown in FIG. 3, respectively is divided into two as shown in FIG. 4, a divided surface shown in FIG. 18 is used in the third embodiment.

FIG. 18 shows detection surfaces of the beam detectors PD11, PD12 and PD13 used in the third embodiment of the present invention.

In FIG. 18, (a) shows that each of the beam detectors PD11 and PD13 to detect the side mark 16 has a detection surface divided into six. The position of one divided region corresponds to each pit 17 shown in FIG. 17.

For example, the light which detected an upper left pit is inputted to an upper left region and it is used to recognize the existence of the upper left pit. When one side mark includes eight pits, the detection surface of the beam detector is divided into eight. That is, the divided surfaces of the beam detectors PD11 and PD13 depend on the number of pits which constitute one side mark 16.

Although a configuration of each divided region of the detection surface shown in (a) of FIG. 18 is a square, it may be a circle.

In FIG. 18, (b) shows a detection example of a position detection mark in the position P23 shown in FIG. 17.

The beam detectors PD11 and PD13 detect the side marks 16-1 and 16-2 and existence of the pit 17 in a corresponding position in each divided region. The beam detector PD12 detects the center mark 15.

The beam detector PD12 detecting the center mark 15 has a detection surface which is divided into four. This means that it is also used for focusing or tracking and when only the moving light is detected, the beam detector having the detection surface divided into two shown in FIG. 4 may be used. However, the division number of the beam detector PD12 is not limited to two nor four.

According to this embodiment, the recording position is recognized by the detection light from the beam detector PD12 and the physical address of that recording position is recognized by the detection light from the adjacent beam detectors PD11 and PD13.

That is, when it is confirmed that which divided region of the beam detectors PD11 and PD13 detects the light, since the arrangement of the pit group of the side mark can be found, its physical address can be specified.

FIG. 19 is an explanatory diagram showing position detection according to the third embodiment of the present invention.

FIG. 19 shows a normal case in which there is no defect in the position detection mark. The arrangement of pits corresponding to the physical address of the position P21 is formed as side marks 16-1 and 16-2 in the position P21.

In addition, side marks having their pit arrangements corresponding to physical addresses are formed in the positions P22 and P23.

First, when the center mark 15 is irradiated with the light beam B2 in the position P21, its reflected light is inputted to the detection surface of the beam detector PD12, and its center mark 15 is detected. At the same time, reflected lights from the three pits 17 which constitute each of the side marks 16-1 and 16-2 in the position P21 are detected in each region of the beam detectors PD11 and PD13.

At this time, when it is analyzed that which divided region is detected by the light, the physical address of the side mark can be specified.

Here, it is assumed that the physical address of the position P21 is specified as "100" as a result of the above analysis.

According to the third embodiment, when the center mark 15 is detected, the position P21 is recognized as a recording position or a reproducing position and at the same time, the physical address of the position P21 is recognized as "100" by analyzing the side marks 16-1 and 16-2.

When the physical address of the position in which recording is requested is "100", since it coincides with the detected physical address a "100" of the present position P21, the requested page data is recorded in the recording region centered on the center mark 15 in the position P21.

When the physical address in which recording is requested is different from the physical address of the position P21, the light beam is moved and the same analyzing process is performed for the adjacent position P22 to confirm its physical address. When there is no defect in the center mark 15, the physical address "101" in that position P22 is recognized, and when it coincides with the requested physical address, the recording operation is performed.

Figure 20:
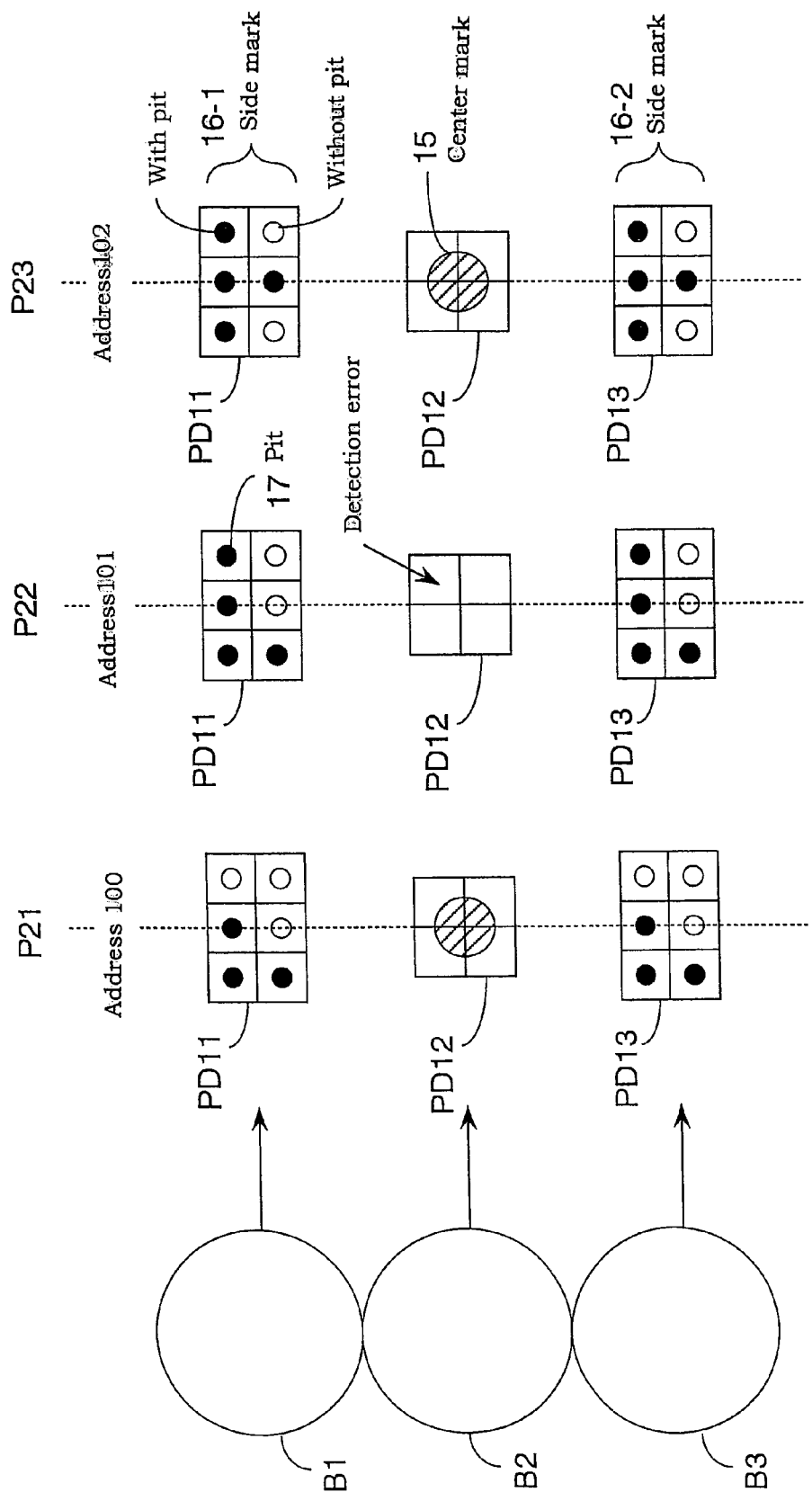
FIG. 20 is an explanatory diagram showing a position detection process in an abnormal case according to the third embodiment of the present invention.
Figure 21:
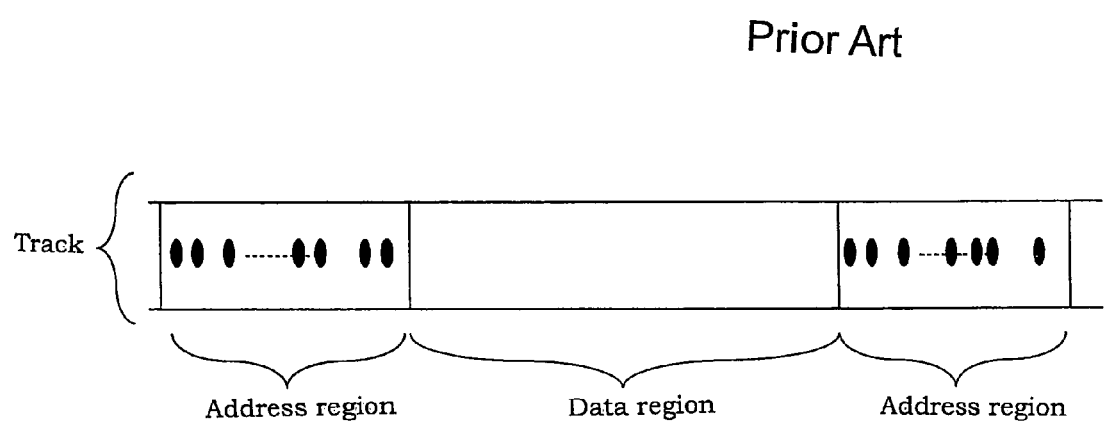
FIG. 21 is an explanatory view showing an address of a conventional optical disk.

FIG. 20 is an explanatory diagram showing position detection in a case there is a defect in the center mark 15 among the position detection marks.

It is assumed that the center mark 15 in the position P22 could not be detected.

At this time, if there is no side marks 16-1 and 16-2, data cannot be recorded in the recording region centered on the position P22, a recording error is generated.

However, side marks 16-1 and 16-2 are provided according to the third embodiment of the present invention, even when the center mark 15 is not detected by the beam detector PD12, the physical address "101" in the position P22 can be detected. Thus, it can be recognized that the recording position is to exist in the vicinity of the position P22.

In addition, even when the recording position cannot be specified due to a detection error of the center mark 15 in the position P22, since the center mark 15 can be detected in the next position P23 and the physical address in that position is specified as "102", it can be found that the physical address "100" in the position P21 and the physical address "102" in the position P23 are not sequential in the adjacent recording positions P21 and P23.

That is, it can be found that one recording position is omitted. In this case, the light beam is moved backward to the position P22 and the position detection mark may be reconfirmed. When the recording position (center mark) can be confirmed by the reconfirmation and the physical addresses coincide with each other, the page data can be recorded in the position P22.

Although the two rows of the side marks 16-1 and 16-2 are provided in FIG. 17, only one of the side marks 16-1 and 16-2 may be provided. That is, the position detection marks may consist of one center mark row and one side mark row.

Since the side mark row is provided in the third embodiment also, the recording or reproducing position can be detected with high precision.

According to the present invention, the holographic recording medium has the aforementioned position detection patterns including the first detection mark row and the second detection mark row. Therefore, it is possible to improve the precision upon detecting the recording position and the reproducing position of page data, and to avoid a detection error of the recording and reproducing position and erroneous detection of the recording and reproducing position.

Further, the recording position and the reproducing position can be confirmed before execution of the recording and reproducing process for the page data itself Therefore, it is possible to improve time efficiency of the recording and reproducing process.

What is claimed is:

1. A holographic recording medium comprising:
a track in which position information to specify a recording position and a reproducing position of page data is formed, the position information of the track being formed of position detection patterns, the position detection patterns each including
a first detection mark row including center pits arranged at predetermined intervals; and
a second detection mark row including side marks arranged at the same intervals as the intervals of the center pits, the side marks having lengths substantially corresponding to integral multiples of the intervals of the center pits,
wherein the second detection mark row is arranged adjacent to the first detection mark row such that both ends of the side marks are arranged so as to correspond to the center pits in a track width direction, and
page data is recorded and reproduced on the basis of positions of the center pits or positions of the ends of the side marks.

2. The holographic recording medium according to claim 1, wherein
each end of the side marks of the second detection mark row coincides with the center of each center pit in the track width direction.

3. The holographic recording medium according to claim 1, wherein
the position detection patterns include one first detection mark row and two second mark rows arranged at both sides of the first detection mark row,
a side mark A of one second detection mark row has a length corresponding to almost three times as long as the interval of the center pits, and each end of the side mark A is arranged so as to correspond to the center of the center pits in the track width direction, and
a side mark B of the other second detection mark row has almost the same length as the interval of the center pits, and each end of the center pit B coincides with the center of each center pit in the track width direction.

4. The holographic recording medium according to claim 1, wherein
the position detection patterns include one first detection mark row,
the second detection mark row include two side marks A and B arranged on both sides of the first detection mark row,
each of the side marks A and B of the second detection mark row has a length corresponding to almost three times as long as the interval of the center pits, and
the side marks A and B of the second detection mark row are arranged such that each end corresponds to a position of the center pit of the first detection mark row in the track width direction, a left end of the side mark A does not coincide with a left end of the side mark B and a right end of the side mark A does not coincide with a right end of the side mark B.

5. A holographic recording medium comprising:
a track in which position information to specify a recording position and a reproducing position of page data is formed, wherein
position detection patterns which constitute the position information of the track include a detection mark row including side marks arranged at regular intervals, and
page data is recorded and reproduced on the basis of an end position of the side marks.

* * * * *